United States Patent
Munemoto et al.

(10) Patent No.: US 12,263,751 B2
(45) Date of Patent: Apr. 1, 2025

(54) CONTROL SYSTEM FOR SHOWING ADVANTAGE AND DISADVANTAGE OF ENERGY MANAGEMENT REQUEST

(71) Applicant: TOYOTA JIDOSHA KABUSHIKI KAISHA, Toyota (JP)

(72) Inventors: Kentaro Munemoto, Kuwana (JP); Kenji Nakao, Toyota (JP); Toru Ando, Obu (JP); Yoshiyuki Tsuchiya, Hamamatsu (JP); Shigeki Kinomura, Toyota (JP); Yuya Aoki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 525 days.

(21) Appl. No.: 17/692,416

(22) Filed: Mar. 11, 2022

(65) Prior Publication Data

US 2022/0305948 A1 Sep. 29, 2022

(30) Foreign Application Priority Data

Mar. 26, 2021 (JP) ................................. 2021-053235

(51) Int. Cl.
*B60L 53/68* (2019.01)
*B60L 53/30* (2019.01)
*B60L 53/62* (2019.01)

(52) U.S. Cl.
CPC ............ *B60L 53/68* (2019.02); *B60L 53/305* (2019.02); *B60L 53/62* (2019.02); *B60L 2250/16* (2013.01)

(58) Field of Classification Search
CPC ........ B60L 53/68; B60L 53/305; B60L 53/62; B60L 2250/16; B60L 55/00; B60L 58/12; B60L 58/16; B60K 35/00; B60K 35/28; B60K 2360/16

USPC ......................................................... 320/137
See application file for complete search history.

(56) References Cited

U.S. PATENT DOCUMENTS

| | | | |
|---|---|---|---|
| 9,527,400 B2 * | 12/2016 | Rhodes | B60L 15/2045 |
| 9,821,763 B2 * | 11/2017 | Yuan | B60W 40/08 |
| 12,059,970 B2 * | 8/2024 | Tsuchiya | G06Q 50/06 |
| 2011/0282513 A1 * | 11/2011 | Son | B60L 53/64 |
| | | | 700/297 |
| 2015/0283912 A1 * | 10/2015 | Shimizu | B60L 55/00 |
| | | | 320/157 |
| 2018/0241229 A1 * | 8/2018 | Kitaoka | B60L 53/63 |
| 2019/0288512 A1 | 9/2019 | Yasumura | |
| 2020/0307410 A1 * | 10/2020 | Tsuda | H02J 7/007 |
| 2020/0384878 A1 | 12/2020 | Pontefract et al. | |
| 2020/0406771 A1 * | 12/2020 | Okumura | H02J 3/381 |

(Continued)

FOREIGN PATENT DOCUMENTS

| | | |
|---|---|---|
| JP | 2012-244663 A | 12/2012 |
| JP | 2018-207590 A | 12/2018 |

(Continued)

*Primary Examiner* — M Baye Diao
(74) *Attorney, Agent, or Firm* — Oliff PLC

(57) ABSTRACT

A display device is configured to display a screen showing, on the same graph in which an axis indicates time, a predicted transition of a first parameter relating to a remaining charge of a power storage device and a predicted transition of a second parameter relating to an amount of reward for energy management under an assumption that charge and discharge control is executed on the power storage device in response to a request for the energy management.

10 Claims, 18 Drawing Sheets

(56) References Cited

U.S. PATENT DOCUMENTS

| | | | |
|---|---|---|---|
| 2021/0053459 A1 | 2/2021 | Tsuchiya et al. | |
| 2021/0255251 A1* | 8/2021 | Ukumori | H02J 7/0048 |
| 2021/0276531 A1* | 9/2021 | Xu | B60W 20/20 |

FOREIGN PATENT DOCUMENTS

| | | |
|---|---|---|
| JP | 2019-165547 A | 9/2019 |
| WO | 2017/013754 A1 | 1/2017 |

* cited by examiner

CONTROL SYSTEM FOR SHOWING ADVANTAGE AND DISADVANTAGE OF ENERGY MANAGEMENT REQUEST

CROSS-REFERENCE TO RELATED APPLICATION

This application claims priority to Japanese Patent Application No. 2021-053235 filed on Mar. 26, 2021, incorporated herein by reference in its entirety.

BACKGROUND

1. Technical Field

The present disclosure relates to a control system and a display device, and more particularly, to an energy management technology.

2. Description of Related Art

There is known a system in which a reward (incentive) is given to customers who respond to an energy management request from an electricity market (for example, a balancing market) or an electric utility (for example, an electric power company). Japanese Unexamined Patent Application Publication No. 2019-165547 (JP 2019-165547 A) discloses a control system that discharges a power storage device during a request period when a power supply request is made.

SUMMARY

A user of the power storage device can receive a reward by charging or discharging the power storage device in response to an energy management request (for example, a power supply request). In some circumstances, however, the user of the power storage device may desire to use the power storage device for other purposes rather than charging and discharging the power storage device as requested to receive a reward. It is desirable that the user be able to decide whether to respond to the energy management request after understanding an advantage and disadvantage to respond to the request. Therefore, there is a demand for a user interface that clearly shows, to the user, the advantage and disadvantage to respond to the energy management request.

The present disclosure has been made to solve the problem described above, and has an object to provide a control system and a display device that can clearly show, to a user, an advantage and disadvantage to respond to an energy management request.

An aspect of the present disclosure relates to a control system. The control system includes a power storage device, a display device, and a processor. The processor is configured to: perform charge and discharge control on the power storage device; perform display control on the display device; and cause the display device to display a screen showing, on the same graph in which an axis indicates time, a predicted transition of a first parameter relating to a remaining charge of the power storage device and a predicted transition of a second parameter relating to an amount of reward for energy management under an assumption that the charge and discharge control is executed on the power storage device in response to a request for the energy management.

In the control system, the screen displayed by the display device (hereinafter also referred to as "prediction screen") shows the predicted transitions of the first and second parameters on the same time axis under the assumption that the charge and discharge control is executed on the power storage device in response to the request for the energy management. The first parameter relates to the remaining charge of the power storage device. The second parameter relates to the amount of reward for the energy management. From the prediction screen, the user can easily grasp how much electric power remains in the power storage device during a time frame in which the user desires to use the power storage device. From the prediction screen, the user can check the amount of reward when responding to the request for the energy management. This makes it easier for the user to compare an advantage and disadvantage to respond to the request for the energy management. The user can easily and appropriately determine whether to respond to the request.

In the above aspect, the control system may further include a communication device communicable with an external computer and an input device configured to receive an input from a user. The processor may be configured to: execute a predetermined process based on the input to the input device from the user; cause the display device to display the prediction screen when the communication device receives the request for the energy management from the external computer; and notify the external computer about whether to accept the request when information indicating whether to accept the request is input to the input device after the prediction screen is displayed.

According to the configuration described above, the user determines whether to respond to the request for the energy management by viewing the prediction screen, and then selects acceptance or rejection of the request by operating the input device. Thus, it is possible to answer acceptance or rejection to the external computer. The first to third control devices may be mounted on one unit together, or may be mounted on a plurality of units separately.

In the above aspect, the processor may be configured to: operate in a control mode out of a first control mode and a second control mode; switch the control mode based on the input to the input device from the user; cause the display device to display the screen when the communication device receives the request for the energy management from the external computer while the processor operates in the first control mode; and when the communication device receives the request for the energy management from the external computer while the processor operates in the second control mode, determine whether to accept the request based on a predetermined condition and notify the external computer about a determined result.

According to the configuration described above, the user can switch the first control mode in which the user determines whether the energy management is possible (that is, determines whether to respond to the request for the energy management) and the second control mode in which determination is automatically made as to whether the energy management is possible. Therefore, the user convenience is improved.

In the above aspect, a lower limit value of the remaining charge of the power storage device may be specified as the predetermined condition. The processor may be configured to determine to reject the request for the energy management when the processor operates in the second control mode and predicts that the remaining charge of the power storage device falls below the lower limit value in a case where the charge and discharge control is executed on the power storage device in response to the request.

According to the configuration described above, it is possible to suppress an excessive decrease in the remaining charge of the power storage device by the energy management. The lower limit value of the remaining charge of the power storage device may be set to any value by the user, or may automatically be set to a predetermined value.

In the above aspect, an upper limit value of the remaining charge of the power storage device may be specified as the predetermined condition. The processor may be configured to determine to reject the request for the energy management when the processor operates in the second control mode and predicts that the remaining charge of the power storage device exceeds the upper limit value in a case where the charge and discharge control is executed on the power storage device in response to the request.

According to the configuration described above, it is possible to suppress an excessive increase in the remaining charge of the power storage device by the energy management. The upper limit value may be set to any value by the user, or may automatically be set to a predetermined value. Both the lower limit value and the upper limit value of the remaining charge of the power storage device may be specified as the predetermined condition.

In the above aspect, a requested reward amount may be specified as the predetermined condition. The processor may be configured to determine to accept the request for the energy management when the processor operates in the second control mode and a reward amount is equal to or more than the requested reward amount in a case where the charge and discharge control is executed on the power storage device in response to the request. According to the configuration described above, it becomes easy for a user to participate energy management having high rewards.

In the above aspect, the power storage device may be mounted on a vehicle. The processor may be configured to determine to reject the request for the energy management when the processor operates in the second control mode and predicts that the vehicle is not able to travel in accordance with a traveling plan in a case where the charge and discharge control is executed on the power storage device in response to the request.

According to the configuration described above, it is possible to reduce the occurrence of the case where the vehicle cannot travel in accordance with the traveling plan by the energy management.

In the above aspect, the processor may be configured to: cause the display device to display a screen showing, on the same graph in which an axis indicates time, predicted transitions of one or more of the first parameters selected from first options including an SOC of the power storage device and a possible cruising distance of a vehicle including the power storage device and predicted transitions of one or more of the second parameters selected from second options including a reward unit price and an accumulated reward amount; and select one or more of the first parameters from the first options and one or more of the second parameters from the second options based on the input to the input device from the user.

According to the configuration described above, the user can select the first parameter to be displayed on the display device from the plurality of candidates (for example, a state of charge (SOC) of the power storage device and a possible cruising distance of the vehicle). The user can also select the second parameter to be displayed on the display device from the plurality of candidates (for example, the reward unit price and the accumulated reward amount). The display device may display a plurality of first parameters (or a plurality of second parameters) on the prediction screen simultaneously.

The method for determining the first and second parameters is not limited to the method described above and may be any method. For example, in the above aspect, the request for the energy management may request discharge of the power storage device. The first parameter may be the SOC of the power storage device. The second parameter may be a reward unit price. The SOC indicates the remaining charge. For example, the SOC is the ratio of a currently stored charge to a charge stored in a fully charged state, and is expressed within a range of 0% to 100%.

In the above aspect, the processor may be configured to: permit remote control of the processor when the request is accepted; and forbid the remote control of the processor when the request is rejected.

According to the configuration described above, for example, the external computer can remotely control the first control device to perform the charge and discharge control on the power storage device in response to the accepted request.

An aspect of the present disclosure relates to a control system. The control system includes: a power storage device; a display device; a first processor configured to perform charge and discharge control on the power storage device; and a second processor different from the first processor. The second processor is configured to: perform display control on the display device; and cause the display device to display a screen showing, on the same graph in which an axis indicates time, a predicted transition of a first parameter relating to a remaining charge of the power storage device and a predicted transition of a second parameter relating to an amount of reward for energy management under an assumption that the charge and discharge control is executed on the power storage device in response to a request for the energy management.

An aspect of the present disclosure relates to a display device. The display device includes a display. The display is configured to display a screen showing, on the same graph in which an axis indicates time, a predicted transition of a first parameter relating to a remaining charge of a power storage device and a predicted transition of a second parameter relating to an amount of reward for energy management under an assumption that charge and discharge control is executed on the power storage device in response to a request for the energy management.

With the display device as well as the control system described above, it is possible to clearly show, to the user, the advantage and disadvantage to respond to the request for the energy management.

According to the present disclosure, it is possible to provide the control system and the display device that can clearly show, to the user, the advantage and disadvantage to respond to the energy management request.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described in detail below with reference to the drawings. The same or corresponding parts are denoted by the same signs throughout the drawings, and description thereof will not be repeated.

Figure 1:
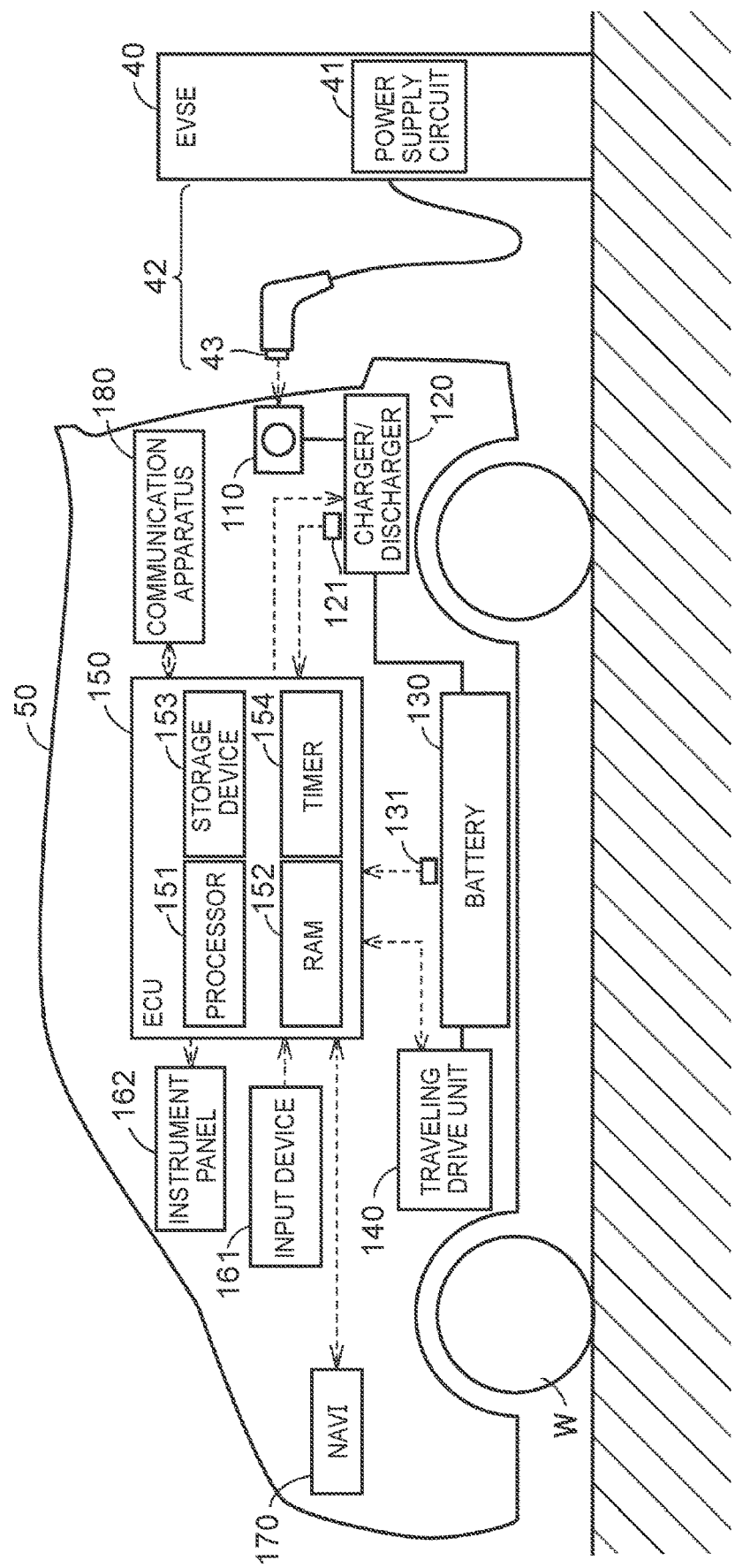
FIG. 1 is a diagram illustrating a configuration of a vehicle including a control system according to an embodiment of the present disclosure.

FIG. 1 is a diagram illustrating a configuration of a vehicle 50 including a control system according to the present embodiment. Referring to FIG. 1, the vehicle 50 includes a battery 130 that stores electric power for traveling. The vehicle 50 can travel by using the electric power stored in the battery 130. The vehicle 50 according to the present embodiment is a battery electric vehicle (BEV) not equipped with an engine (internal combustion engine).

The battery 130 includes a secondary battery such as a lithium ion battery or a nickel metal hydride battery. In the present embodiment, the secondary battery is a battery pack including a plurality of lithium ion batteries. The battery pack is composed of a plurality of secondary batteries (generally also referred to as "cells") electrically connected to each other. Other power storage devices such as an electric double-layer capacitor may be used instead of the secondary battery. The battery 130 according to the present embodiment is an example of "power storage device" according to the present disclosure.

The vehicle 50 includes an electronic control unit (ECU) 150. The ECU 150 performs charge control and discharge control on the battery 130. The ECU 150 controls communication with the outside of the vehicle 50.

The vehicle 50 further includes a monitoring module 131 that monitors conditions of the battery 130. The monitoring module 131 includes various sensors that detect the conditions (for example, voltage, current, and temperature) of the battery 130. The monitoring module 131 outputs detection results to the ECU 150. The monitoring module 131 may be a battery management system (BMS) that has a state of charge (SOC) estimation function, a state of health (SOH) estimation function, a cell voltage equalization function, a diagnostic function, and a communication function in addition to the sensor functions. The ECU 150 can acquire the conditions (for example, temperature, current, voltage, SOC, and internal resistance) of the battery 130 based on the output of the monitoring module 131.

Electric vehicle supply equipment (EVSE) 40 is an example of power supply equipment outside the vehicle. A power supply circuit 41 is built in a body of the EVSE 40. A charging cable 42 is connected to the body of the EVSE 40. The charging cable 42 may always be connected to the body of the EVSE 40 or may be detachable from the body of the EVSE 40. The charging cable 42 has a connector 43 at its end and includes a power line inside.

The vehicle 50 includes an inlet 110 and a charger/discharger 120 for contact charging. The inlet 110 receives electric power supplied from the outside of the vehicle 50. The connector 43 of the charging cable 42 can be connected to the inlet 110. The vehicle 50 is plugged in by connecting (plugging), to the inlet 110 of the vehicle 50, the connector 43 of the charging cable 42 connected to the body of the EVSE 40.

The EVSE 40 according to the present embodiment is alternating current (AC) power supply equipment that supplies AC power. As will be described in detail later, the EVSE 40 is compatible with reverse power flow (also known as "backfeeding"). Although FIG. 1 illustrates only the inlet 110 and the charger/discharger 120 that are compatible with the power supply method of the EVSE 40, the vehicle 50 may include a plurality of inlets so that the vehicle 50 is compatible with a plurality of types of power supply method (for example, AC method and direct current (DC) method).

The charger/discharger 120 is located between the inlet 110 and the battery 130. The charger/discharger 120 includes a relay and a power conversion circuit (both are not illustrated). The relay switches connection and disconnection of a power path from the inlet 110 to the battery 130. The power conversion circuit performs AC-DC conversion in both directions. The power conversion circuit converts the AC power supplied from the EVSE 40 into DC power and outputs the DC power to the battery 130. The power conversion circuit also converts the DC power supplied from the battery 130 into AC power and outputs the AC power to the inlet 110. Examples of the power conversion circuit include a bidirectional inverter. The charger/discharger 120 may further include at least one of a rectifier circuit, a power factor correction circuit, an insulation circuit, a transformer (for example, an isolation transformer), and a filter circuit. The relay and the power conversion circuit in the charger/discharger 120 are controlled by the ECU 150.

The vehicle 50 further includes a monitoring module 121 that monitors conditions of the charger/discharger 120. The monitoring module 121 includes various sensors that detect the conditions of the charger/discharger 120, and outputs detection results to the ECU 150. In the present embodiment, the monitoring module 121 detects a voltage and a current input to the power conversion circuit and a voltage and a current output from the power conversion circuit. The monitoring module 121 can detect charging power and discharging power of the battery 130.

External charging (that is, charge of the battery 130 with electric power supplied from the outside of the vehicle) and external power feeding (that is, supply of electric power from the vehicle 50 to the outside of the vehicle) can be performed in the plugged-in vehicle 50. Electric power for external charging is supplied from, for example, the EVSE 40 to the inlet 110. The charger/discharger 120 converts the electric power received by the inlet 110 to electric power suitable for charging the battery 130 and outputs the converted electric power to the battery 130. Electric power for external power feeding is supplied from the battery 130 to the charger/discharger 120. The charger/discharger 120 converts the electric power supplied from the battery 130 to electric power suitable for external power feeding and outputs the converted electric power to the inlet 110. The relay of the charger/discharger 120 is closed (connected) when external charging or external power feeding is performed. The relay of the charger/discharger 120 is opened (disconnected) when neither external charging nor external power feeding is performed.

The ECU 150 includes a processor 151, a random access memory (RAM) 152, a storage device 153, and a timer 154. The ECU 150 may be a computer. The processor 151 may be a central processing unit (CPU). The RAM 152 functions as a working memory for temporarily storing data that is processed by the processor 151. The storage device 153 can save stored information. The storage device 153 includes, for example, a read-only memory (ROM) and a rewritable nonvolatile memory. The storage device 153 stores programs and information to be used in the programs (for example, maps, mathematical expressions, and various parameters). In the present embodiment, various types of control in the ECU 150 are performed by the processor 151 executing the programs stored in the storage device 153. The various types of control in the ECU 150 may be performed not only by software, but also by dedicated hardware (electronic circuit). The ECU 150 may include any number of processors, and may have a processor for each predetermined control.

The timer 154 notifies the processor 151 when a set time comes. When the time set on the timer 154 comes, the timer 154 transmits a notification signal to the processor 151. In the present embodiment, the timer 154 is a timer circuit. The timer 154 may be implemented by software instead of hardware (timer circuit). The ECU 150 can acquire a current time by using a real-time clock (RTC) circuit (not illustrated) built in the ECU 150.

The vehicle 50 further includes a traveling drive unit 140, an input device 161, an instrument panel 162, a navigation system (hereinafter referred to as "NAVI") 170, a communication apparatus 180, and drive wheels W. The drive system for the vehicle 50 is not limited to front-wheel drive illustrated in FIG. 1, and may be rear-wheel drive or four-wheel drive.

The traveling drive unit 140 includes a power control unit (PCU) and a motor generator (MG) (both are not illustrated), and causes the vehicle 50 to travel with electric power stored in the battery 130. The PCU includes, for example, an inverter, a converter, and a relay (hereinafter referred to as "system main relay (SMR)") (none of which are illustrated). The PCU is controlled by the ECU 150. Examples of the MG include a three-phase AC motor generator. The MG is driven by the PCU to rotate the drive wheels W. The PCU drives the MG with electric power supplied from the battery 130. The MG regeneratively generates electric power and supplies the generated electric power to the battery 130. The SMR switches connection and disconnection of a power path from the battery 130 to the MG. The SMR is closed (connected) when the vehicle 50 is traveling.

The input device 161 receives inputs from a user. The input device 161 is operated by the user and outputs signals corresponding to the user's operations to the ECU 150. Examples of the input device 161 include various switches, various pointing devices, a keyboard, and a touch panel. The input device 161 may include a smart speaker that receives voice inputs.

The instrument panel 162 displays information on the vehicle 50. For example, the instrument panel 162 displays various types of information on the vehicle 50 that are measured by various sensors mounted on the vehicle 50. The information to be displayed on the instrument panel 162 may include at least one of an outside air temperature, a traveling speed of the vehicle 50, an SOC of the battery 130, an energy efficiency of the vehicle 50, and a traveling distance of the vehicle 50. The instrument panel 162 may be a touch panel display. The instrument panel 162 is controlled by the ECU 150. The ECU 150 may cause the instrument panel 162 to display a message or a warning light for the user when a predetermined condition is satisfied.

The NAVI 170 includes a processor, a storage device, a touch panel display, and a global positioning system (GPS) module (none of which are illustrated). The storage device stores map information. The touch panel display receives inputs from the user and displays a map and other information. The GPS module receives signals from GPS satellites (hereinafter referred to as "GPS signals"). The NAVI 170 can determine the position of the vehicle 50 by using the GPS signal. The NAVI 170 performs route search for finding a traveling route (for example, the shortest route) from a current position of the vehicle 50 to a destination and displays the traveling route found by the route search on a map.

The communication apparatus 180 includes various communication interfaces (I/Fs). The communication apparatus 180 includes a communication OF for wireless communication with a server 30 (see FIG. 2) described later. The communication apparatus 180 may include a data communication module (DCM). The communication apparatus 180 may include a communication OF compatible with a fifth generation mobile communication system (5G). The ECU 150 communicates with a communication device outside the vehicle 50 via the communication apparatus 180. The communication apparatus 180 according to the present embodiment is an example of "communication device" according to the present disclosure.

Figure 2:
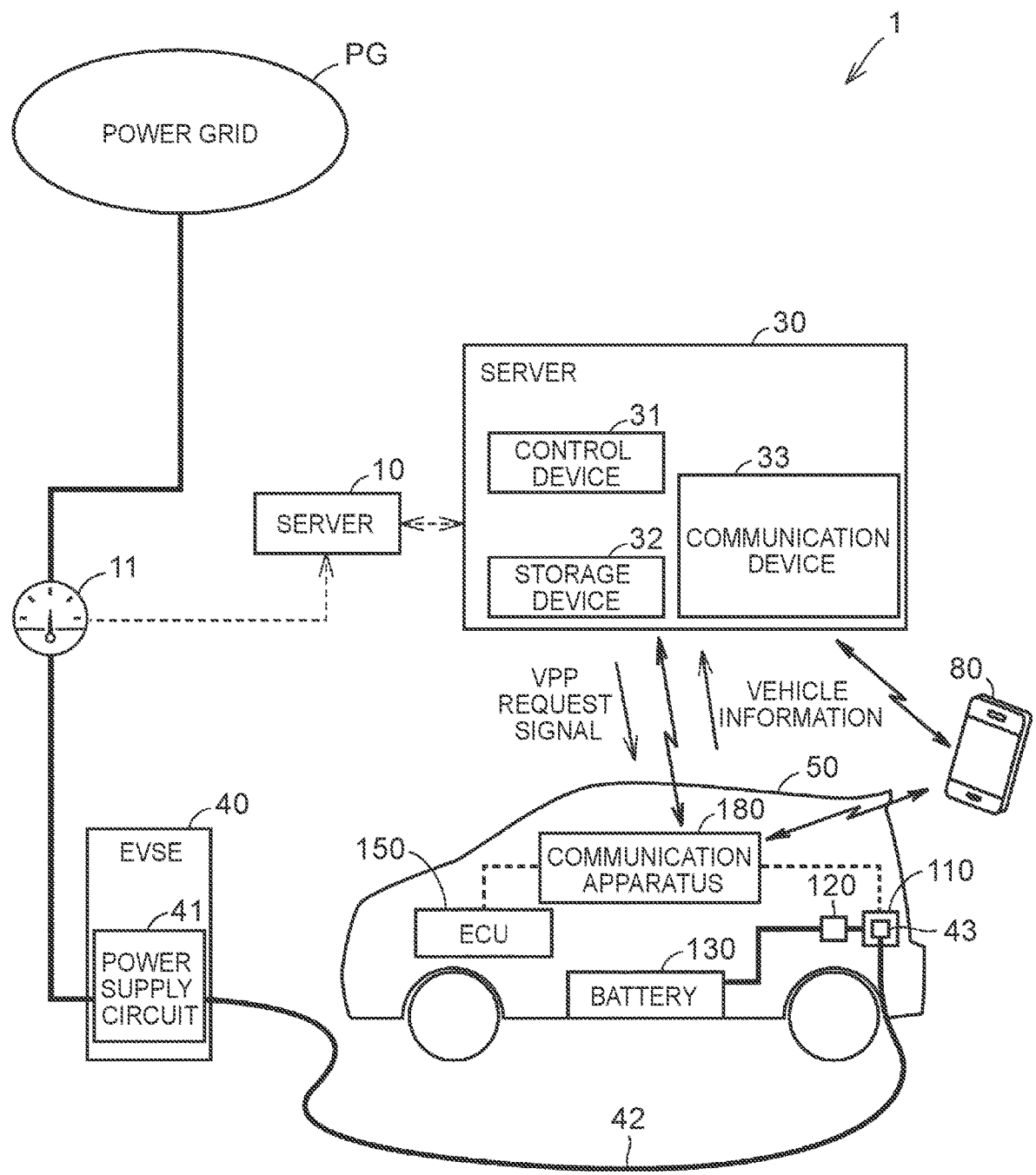
FIG. 2 is a diagram illustrating a configuration of an electric power system according to the embodiment of the present disclosure.

FIG. 2 is a diagram illustrating a configuration of an electric power system according to the present embodiment. An electric power system 1 illustrated in FIG. 2 is a vehicle grid integration (VGI) system. The electric power system 1 functions as a virtual power plant (VPP). The VPP is a system that aggregates a large number of distributed energy resources (hereinafter also referred to as "DERs") by an advanced energy management technology using the Internet of Things (IoT) and performs remote integrated control on the DERs to make the DERs function as if they were a single power plant. Examples of the DERs include energy resources owned by customers (hereinafter also referred to as "demand-side resources (DSRs)"). In the electric power system 1, the DSR for implementing the VPP is the vehicle 50 (that is, an electrified vehicle including a power storage device). Examples of the vehicle 50 include a personally owned vehicle (POV). The EVSE 40 is home-use EVSE installed at a home of the user of the vehicle 50.

In the present embodiment, the electric power system 1 is constituted by a power grid PG, a server 10, the server 30, a smart meter 11, a plurality of EVSEs (only the EVSE 40 is illustrated), and a plurality of DSRs (only the vehicle 50 is illustrated). The numbers of electrified vehicles and EVSEs in the electric power system 1 are independent of each other and can be determined as appropriate. The electric power system 1 may include 10 or more electrified vehicles and 10 or more EVSEs, or may include 100 or more electrified vehicles and 100 or more EVSEs.

A mobile terminal 80 is an example of a mobile terminal carried by the user of the vehicle 50. In the present embodiment, each mobile terminal 80 is a smartphone with a touch panel display. Each mobile terminal 80 is not limited to the smartphone with the touch panel display and may be any mobile terminal. For example, each mobile terminal 80 may be a tablet, a wearable device (for example, a smart watch), or an electronic key.

The vehicle 50 illustrated in FIG. 2 is electrically connected to the EVSE 40. When the connector 43 of the charging cable 42 connected to the body of the EVSE 40 is connected to the inlet 110 of the vehicle 50, the vehicle 50 and the EVSE 40 can communicate with each other, and electric power can also be transferred between the EVSE 40 and the vehicle 50. Thus, the vehicle 50 is ready for external charging and external power feeding. The communication apparatus 180 mounted on the vehicle 50 communicates with the EVSE 40 via the charging cable 42. The communication system between the EVSE 40 and the vehicle 50 may be any system such as a controller area network (CAN) or a programmable logic controller (PLC).

The power supply circuit 41 built in the body of the EVSE 40 is electrically connected to the power grid PG via the smart meter 11. For example, the battery 130 is externally charged when electric power is supplied from the power grid PG to the vehicle 50 via the power supply circuit 41 and the charging cable 42. When the vehicle 50 performs external power feeding to the EVSE 40, electric power can be supplied reversely from the vehicle 50 to the power grid PG via the charging cable 42 and the power supply circuit 41. The power supply circuit 41 converts the electric power supplied from the power grid PG to electric power suitable for external charging, and also converts the electric power supplied from the vehicle 50 to electric power suitable for reverse power flow.

The smart meter 11 measures the amount of electric power supplied from the EVSE 40 to the vehicle 50. The smart meter 11 also measures the amount of electric power reversely supplied from the vehicle 50 to the EVSE 40. The smart meter 11 measures power usage at predetermined time intervals (for example, every 30 minutes), stores the measured power usage, and transmits the measured power usage to the server 10. The server 10 transmits the measured value of the smart meter 11 to the server 30 as needed. The server 10 may transmit the measured value of the smart meter 11 to the server 30 periodically or as requested by the server 30.

The communication apparatus 180 mounted on the vehicle 50 wirelessly communicates with the server 30. The server 30 according to the present embodiment is an example of the "external computer" according to the present disclosure. Signals that are transferred between the communication apparatus 180 and the server 30 may be encrypted.

In the present embodiment, the communication apparatus 180 mounted on the vehicle 50 and the mobile terminal 80 wirelessly communicate with each other. The ECU 150 can control the mobile terminal 80 by wireless communication to cause the mobile terminal 80 to give notifications to the user. The communication between the communication apparatus 180 and the mobile terminal 80 may be short-range communication (for example, direct communication inside and around the vehicle) such as Bluetooth (registered trademark).

Predetermined application software (hereinafter simply referred to as "application") is installed in the mobile terminal 80. The mobile terminal 80 is carried by the user of the vehicle 50 and can exchange information with the server 30 via the application. The user can operate the application via, for example, the touch panel display (not illustrated) of the mobile terminal 80. The touch panel display of the mobile terminal 80 can give notifications to the user of the vehicle 50.

The server 10 belongs to a power transmission and distribution business operator. In the present embodiment, an electric power company serves as both a power producer and a power transmission and distribution business operator. Power plants and power transmission and distribution facilities (both are not illustrated) constitute a power network (that is, the power grid PG). The power transmission and distribution facilities include transmission lines, substations, and distribution lines, and transmit and distribute electric power supplied from the power plants. Examples of the power plants include thermal power plants, hydroelectric power plants, nuclear power plants, and variable renewable energy sources (photovoltaic power generation facilities and wind power generation facilities).

The electric power company maintains and manages the server 10, the smart meter 11, and the power grid PG. The electric power company can make a profit by, for example, doing business with customers who use electric power (for example, individuals or companies). The EVSE 40 is connected to the power grid PG via the smart meter 11. In the present embodiment, the electric power company is an example of a grid operator who runs the power grid PG.

An electric utility that aggregates the DERs and provides energy management services is called "aggregator". The electric power company can work with, for example, the aggregator to perform power adjustment (for example, balance supply and demand) of the power grid PG. The electric power company or the aggregator makes a request for power adjustment of the power grid PG to each customer, and each customer performs power adjustment of the power grid PG in response to the request. This system is generally called "demand response (DR)". The request for power adjustment of the power grid PG is hereinafter also referred to as "VPP request". The VPP request may be an increased charge request (positive DR), a reduced charge request (negative DR), or a discharge request (negative DR). The VPP request is an example of "energy management request" according to the present disclosure.

Each of the server 10 and the server 30 is an example of a management computer that manages the power grid PG. The server 30 belongs to the aggregator. An automaker may also serve as the aggregator. Automakers can easily obtain information on vehicles they manufactured. Each vehicle in the electric power system 1 is registered in the server 30. Each vehicle sequentially transmits information on the vehicle (for example, the position of the vehicle, the connection status of the charging cable, and the power storage amount) to the server 30. The server 30 includes a control device 31, a storage device 32, and a communication device 33. The control device 31 may be a computer. The control device 31 includes a processor, and is configured to perform predetermined information processing and control the communication device 33. The storage device 32 can save various types of information. The communication device 33 includes various communication I/Fs. The control device 31 communicates with the outside via the communication device 33.

The server 30 can communicate with the server 10, the vehicle 50, and the mobile terminal 80. In the present embodiment, the aggregator's terminal (server 30) can communicate with the electric power company's terminal (server 10) and the vehicle user's terminal (communication apparatus 180 and mobile terminal 80). The present disclosure is not limited to this case, and the electric power system 1 may separately include a server that contacts the electric power company and a server that contacts the vehicle user. These servers may be managed by different electric utilities (for example, upper and lower aggregators).

When the server 10 performs power adjustment, the server 10 first selects a necessary number of aggregators for the power adjustment from a plurality of aggregators and makes a VPP request to the selected aggregator(s). The server 30 selects a necessary number of VPP cooperating vehicles to respond to the VPP request of the server 10. The VPP cooperating vehicles refer to vehicles that participate in the VPP (requested power adjustment). The VPP cooperating vehicles are selected from a plurality of vehicles (including the vehicle 50) that belongs to the users who signed a contract with the aggregator in advance. Those users who signed the contract can receive a predetermined reward (incentive) by performing charging or discharging in response to the request from the aggregator. A user who does not respond to the request may have a predetermined penalty under the contract.

In the present embodiment, when the selection of the VPP cooperating vehicles is completed, the server 30 determines a charge and discharge schedule of each VPP cooperating vehicle and transmits a VPP request signal to the user of each VPP cooperating vehicle. The VPP request signal includes the type of requested power adjustment (for example, increased charge, reduced charge, or discharge), a VPP request period (more specifically, the start and end times of the requested power adjustment), a charge and discharge schedule in the VPP request period (for example, transition of charge and discharge power), and reward information. The VPP request signal according to the present embodiment requests the user of the VPP cooperating vehicle to get the VPP cooperating vehicle ready so that the server 30 can perform charge and discharge control on the VPP cooperating vehicle by remote control during the VPP request period. When the start time of the VPP request period set for the VPP cooperating vehicle comes, the server 30 performs the power adjustment requested by the server 10 by transmitting a charge and discharge command (more specifically, a command to cause the VPP cooperating vehicle to perform charge and discharge control) to the VPP cooperating vehicle. The reward information indicates an incentive to be given to the user who has responded to the request from the server 30.

The server 30 measures the amount of power adjustment of each VPP cooperating vehicle with a predetermined electricity meter. The predetermined electricity meter may be the smart meter 11 or an electricity meter mounted on the vehicle 50 (for example, the monitoring modules 121 and 131). The electricity meter may be mounted at any location.

The EVSE 40 may include the electricity meter. The electricity meter may be attached to a portable charging cable.

The server 30 manages incentive information of each user while distinguishing the incentive information based on a user identifier (ID). The incentive information includes, for example, an incentive acquisition amount. The incentive acquisition amount is the total amount of rewards acquired by the user by performing the power adjustment in response to the VPP request. The server 30 may calculate the reward amount for the power adjustment based on an expression such as "reward amount=incentive unit price x power adjustment amount". In the present embodiment, the incentive unit price is linked to a market price. Therefore, the incentive unit price varies depending on time frames. In the present embodiment, an incentive point system is adopted. That is, the incentive acquisition amount is counted by points. As the points increase, the value increases. The points may be handled like virtual currency or may be converted into cash. The points may also be converted into goods or rights (for example, a right to receive services commensurate with the number of points). The incentive system is not limited to the incentive point system, and may arbitrarily be determined by contract.

In the present embodiment, the server 30 and the EVSE 40 do not communicate with each other. However, the server 30 and the EVSE 40 may communicate with each other. The server 30 may communicate with the vehicle 50 via the EVSE 40. The EVSE 40 may communicate with an EVSE management cloud. The communication protocol between the EVSE 40 and the EVSE management cloud may be the Open Charge Point Protocol (OCPP).

Figure 3:
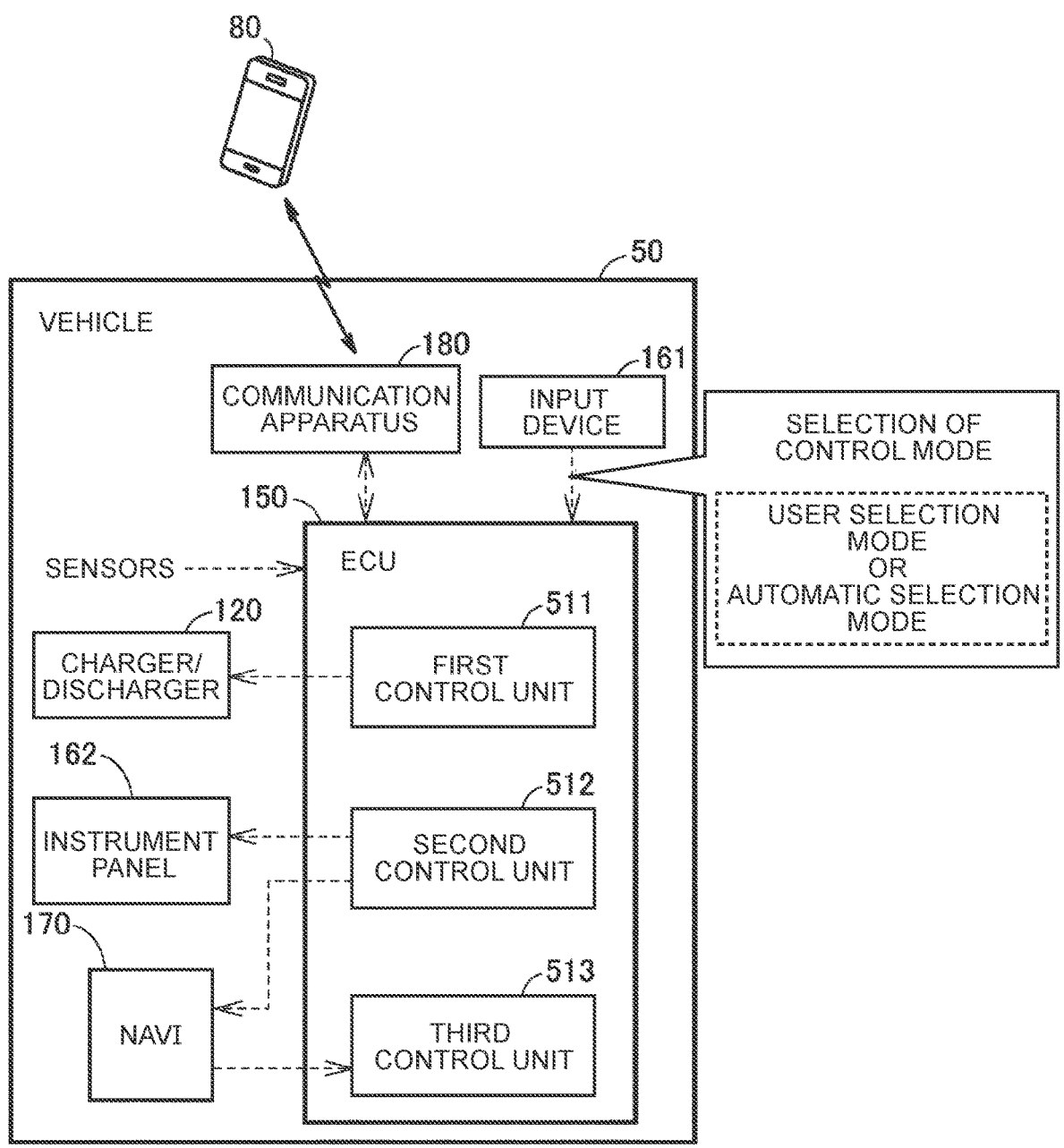
FIG. 3 is a diagram illustrating a detailed configuration of an electronic control unit (ECU) illustrated in FIG. 1.

FIG. 3 is a diagram illustrating a detailed configuration of the ECU 150 of the vehicle 50. Referring to FIG. 3 together with FIGS. 1 and 2, the ECU 150 includes a first control unit 511, a second control unit 512, and a third control unit 513. In the present embodiment, the first control unit 511, the second control unit 512, and the third control unit 513 are examples of "first control device", "second control device", and "third control device" according to the present disclosure, respectively. In the ECU 150 according to the present embodiment, the units mentioned above are embodied by the processor 151 illustrated in FIG. 1 and programs executed by the processor 151 (for example, the programs stored in the storage device 153). These units are not necessarily embodied by the processor 151 and the programs, and may be embodied by dedicated hardware (electronic circuit).

The detected values of various sensors mounted on the vehicle 50 are input to the ECU 150. In addition to the monitoring modules 121 and 131, the vehicle 50 includes, for example, a position sensor, a vehicle speed sensor, an accelerator sensor, an outside air temperature sensor, and a charging cable connection detection circuit (not illustrated). The ECU 150 uses the detected values for control as needed. The ECU 150 sequentially transmits conditions of the vehicle 50 (including, for example, the connection status of the charging cable and the SOC of the battery 130) to the server 30. For example, the server 30 remotely controls the vehicle 50 during the VPP request period while referring to information received from the vehicle 50.

The first control unit 511 performs charge and discharge control on the battery 130. The second control unit 512 controls display of the instrument panel 162, the NAVI 170, and the mobile terminal 80. The third control unit 513 executes a predetermined process based on the user's input to each of the input device 161, the NAVI 170, and the mobile terminal 80.

The second control unit 512 is operable in each control mode that is a user selection mode (first control mode) or an automatic selection mode (second control mode). The third control unit 513 switches the control mode (user selection mode/automatic selection mode) of the second control unit 512 based on the user's input to a predetermined input device (hereinafter referred to as "mode input device"). In the present embodiment, the input device 161 is the mode input device. The present disclosure is not limited to this case, and at least one of the NAVI 170 and the mobile terminal 80 may be adopted as the mode input device in place of or in addition to the input device 161.

Figure 4:
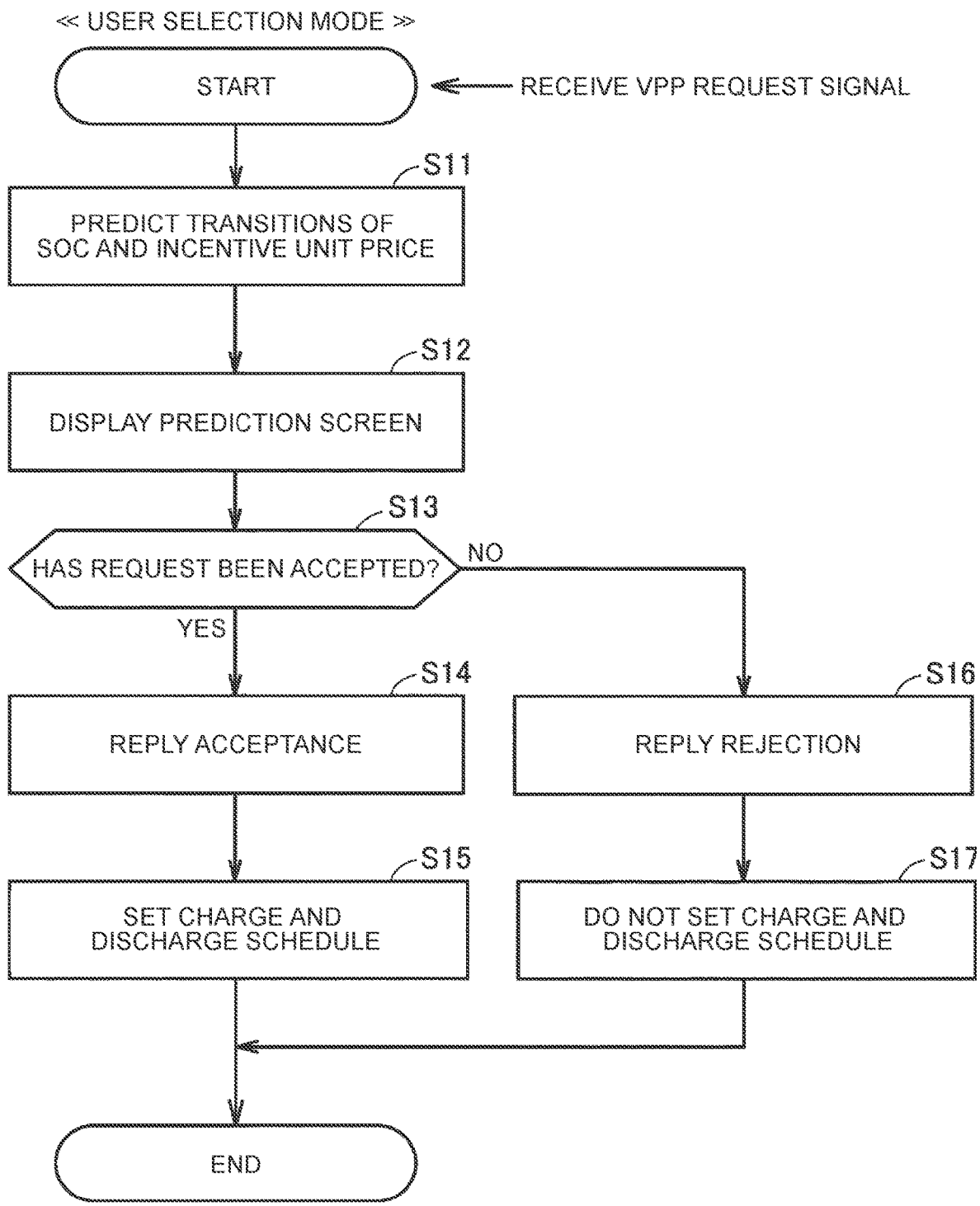
FIG. 4 is a flowchart illustrating an example of a process to be executed by the ECU when a second control unit illustrated in FIG. 3 operates in a user selection mode.

For example, when the user selects the user selection mode via the mode input device, the second control unit 512 operates in the user selection mode. FIG. 4 is a flowchart illustrating an example of a process to be executed by the ECU 150 when the second control unit 512 operates in the user selection mode. The process in this flowchart is started, for example, when the vehicle 50 receives the VPP request signal while the second control unit 512 is operating in the user selection mode. In the present embodiment, when the vehicle 50 is selected as the VPP cooperating vehicle, the server 30 transmits the VPP request signal to the communication apparatus 180 of the vehicle 50. Each step in the flowchart is hereinafter denoted simply by a step number that starts with the letter "S".

Referring to FIG. 4 together with FIGS. 1 to 3, the second control unit 512 determines a charge and discharge schedule in a predetermined target period and predicts transitions of first and second parameters in the target period in S11. In the present embodiment, the target period is a period from a current time (that is, a timing when the vehicle 50 receives the VPP request signal) to a lapse of a predetermined period (for example, 24 hours). The target period includes the VPP request period. The first parameter relates to the remaining charge of the battery 130. In the present embodiment, the SOC of the battery 130 is adopted as the first parameter. The second parameter relates to the amount of reward for energy management. In the present embodiment, the unit price of an incentive given to the user who responds to the VPP request is adopted as the second parameter.

In this example, the energy management requested by the VPP request signal is discharge. Through the process of S11, the charge and discharge schedule (transition of charge and discharge power) in the target period is determined so that the discharge requested by the VPP request signal is executed during the VPP request period and the charge that brings the SOC of the battery 130 closer to a predetermined target value (for example, 80%) is executed outside the VPP request period.

In S12, the second control unit 512 causes a predetermined display device (hereinafter referred to as "screen display device") to display a prediction screen. The prediction screen shows predicted transitions of the first and second parameters in the target period on the same time axis under the assumption that the first control unit 511 executes the charge and discharge control on the battery 130 as requested by the VPP request signal. The screen display device is, for example, at least one of the input device 161, the NAVI 170, and the mobile terminal 80. In the present embodiment, when the communication apparatus 180 receives the VPP request signal from the server 30 while the second control unit 512 is operating in the user selection mode, the second control unit 512 causes the screen display device to display the prediction screen as described above.

Figure 5:
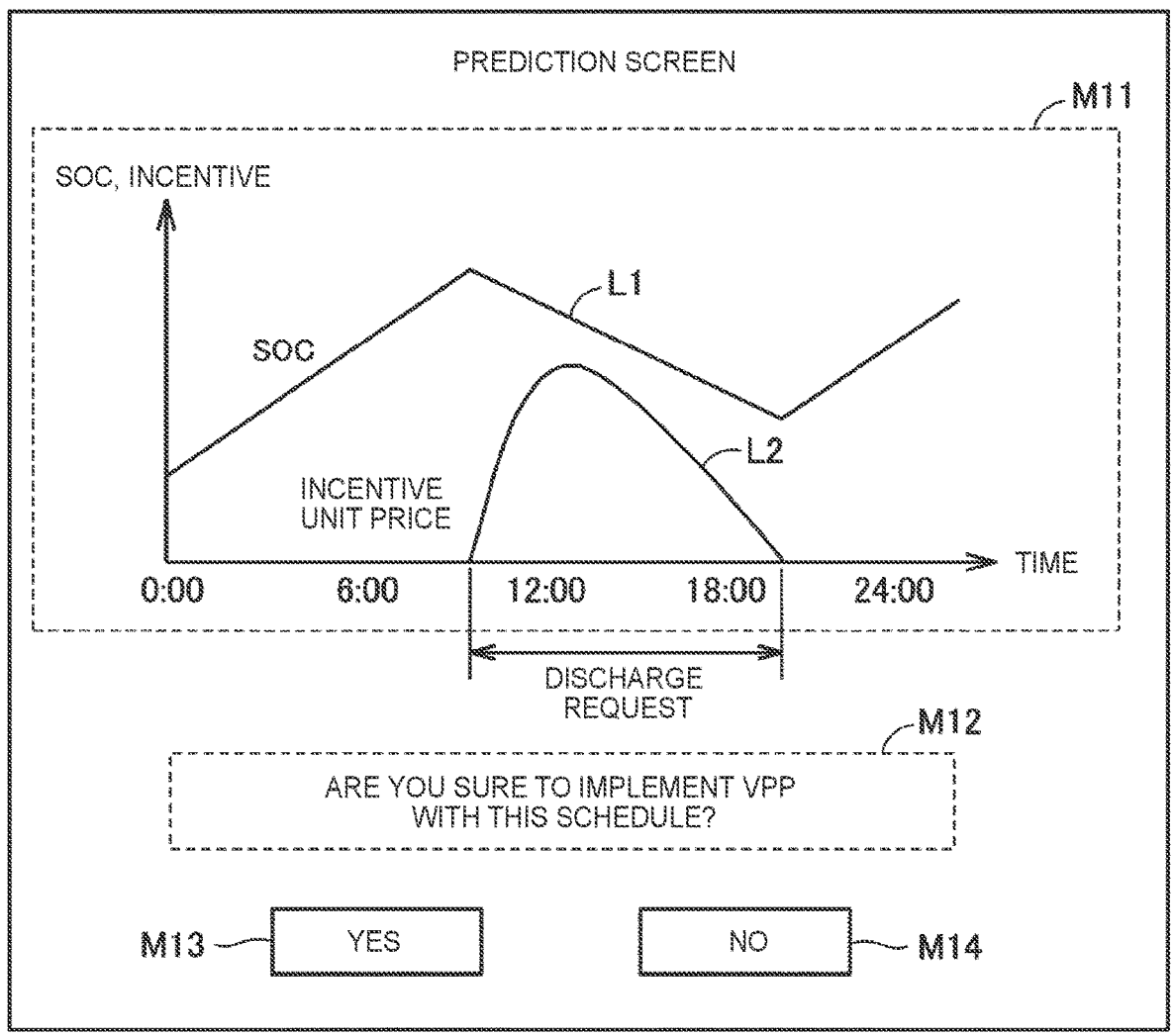
FIG. 5 is a diagram illustrating an example of a prediction screen to be displayed in the process illustrated in FIG. 4.

FIG. 5 is a diagram illustrating an example of the prediction screen. Referring to FIG. 5, the prediction screen shows a graph M11, a message M12, a "YES" button M13, and a "NO" button M14, and prompts the user to select acceptance or rejection of the VPP request.

The graph M11 shows predicted transitions of the first and second parameters on the same time axis under the assumption that the first control unit 511 executes the charge and discharge control on the battery 130 as requested by the VPP request signal. More specifically, the graph M11 in FIG. 5 shows a predicted transition (line L1) of the remaining battery charge (SOC of the battery 130) in the target period and a predicted transition (line L2) of the incentive unit price in the target period on the same time axis under the assumption that the first control unit 511 executes the charge and discharge control on the battery 130 in the target period in accordance with the charge and discharge schedule determined in S11 of FIG. 4.

The message M12 indicates a description about the "YES" button M13 and the "NO" button M14. The user can select the "YES" button M13 or the "NO" button M14 by, for example, touching the screen. These buttons are not limited to virtual buttons displayed on the touch panel display, and may be physical buttons.

Figure 6:
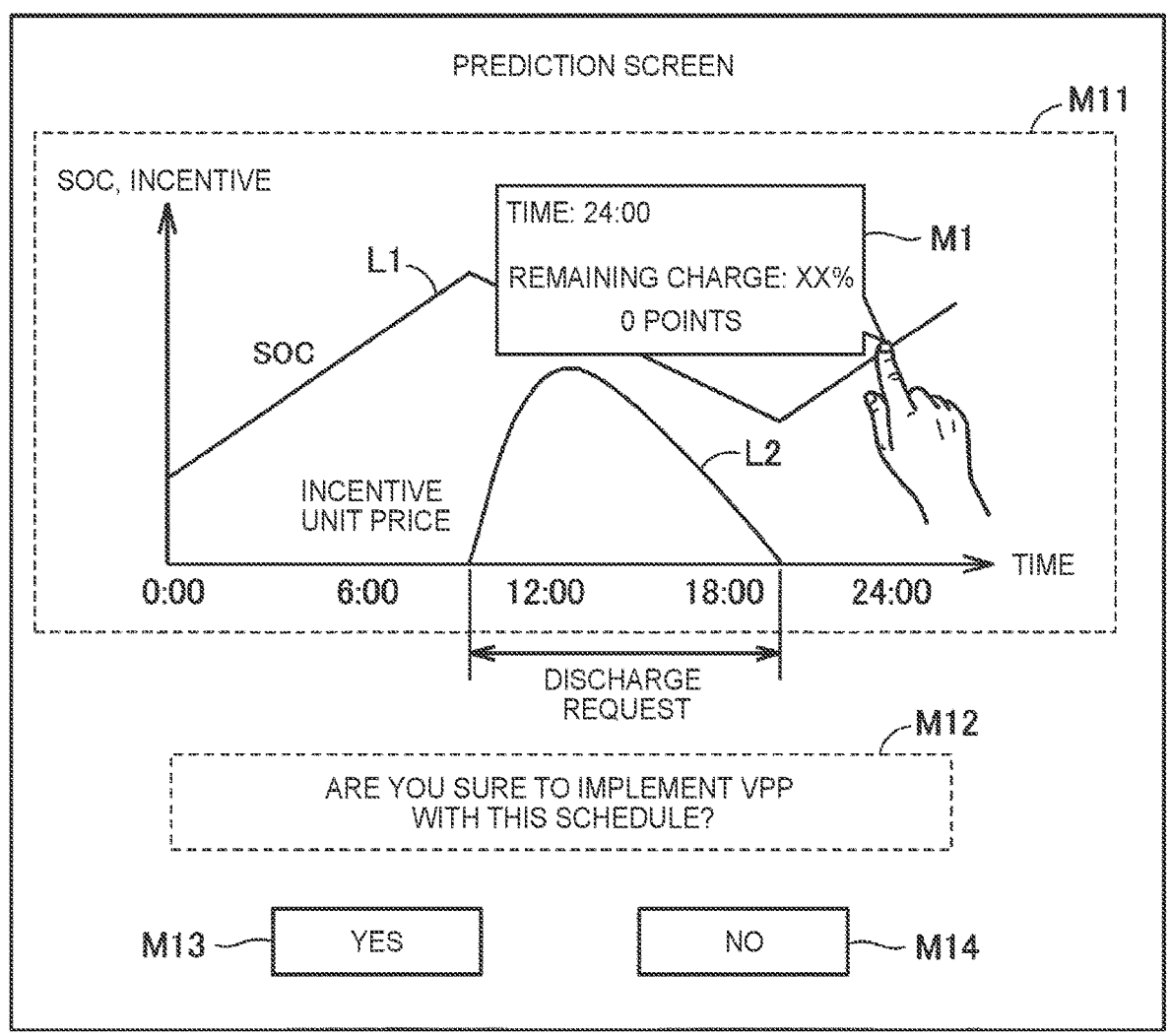
FIG. 6 is a diagram illustrating the prediction screen illustrated in FIG. 5.

FIG. 6 is a diagram illustrating the prediction screen illustrated in FIG. 5. As illustrated in FIG. 6, when the prediction screen is displayed on the touch panel display, the user touches the graph M11 to display the remaining battery charge and the incentive unit price at any time within the target period (for example, a balloon M1 in FIG. 6) on the prediction screen. The time may be specified by a pointing device other than the touch panel, or by inputting a numerical value.

From the prediction screen, the user can easily grasp how much electric power remains in the battery 130 during a time frame in which the user desires to use the battery 130. For example, when the user plans to depart in the vehicle 50 at 24:00, the user checks whether the SOC of the battery 130 at 24:00 is sufficient for traveling of the vehicle 50. When the user determines that the SOC of the battery 130 at 24:00 is sufficient, the user can accept the VPP request by selecting the "YES" button M13. The selection of the "YES" button M13 means that information indicating that the VPP request has been accepted is input to a predetermined input device (for example, the touch panel of the screen display device). When the user determines that the SOC of the battery 130 at 24:00 is insufficient, the user can reject the VPP request by selecting the "NO" button M14. The selection of the "NO" button M14 means that information indicating that the VPP request has been rejected is input to the predetermined input device (for example, the touch panel of the screen display device).

Referring back to FIG. 4 together with FIGS. 1 to 3, the third control unit 513 determines in S13 whether the VPP request has been accepted. The third control unit 513 determines "YES" in S13 when the "YES" button M13 is selected by the user, and determines "NO" in S13 when the "NO" button M14 is selected by the user. The third control unit 513 determines "NO" in S13 also when a predetermined period (for example, 100 seconds) has elapsed without selecting any button after the prediction screen is displayed in S12.

When the determination is "YES" in S13, the third control unit 513 notifies the server 30 about the request acceptance in S14. After the third control unit 513 sets the charge and discharge schedule in the target period on the first control unit 511 in S15, the series of processes illustrated in FIG. 4 is terminated. As a result, the server 30 is permitted to perform remote control on the first control unit 511. The charge and discharge schedule in the target period is the charge and discharge schedule determined in S11. The target period according to the present embodiment is longer than the VPP request period. The VPP request period is an example of a period in which the power adjustment (for example, discharge of the battery 130) is executed in response to the accepted VPP request.

When the determination is "NO" in S13, the third control unit 513 notifies the server 30 about the request rejection in S16. When notified about the request rejection, the server 30 may cancel the selection of the vehicle 50 and select another VPP cooperating vehicle in place of the vehicle 50. Then, the series of processes illustrated in FIG. 4 is terminated without setting the charge and discharge schedule on the first control unit 511 (S17). In the present embodiment, the remote control on the first control unit 511 is permitted by setting the charge and discharge schedule responding to the VPP request on the first control unit 511. Therefore, when the charge and discharge schedule is not set (S17), the server 30 is forbidden to perform the remote control on the first control unit 511.

The charge and discharge control on the battery 130 is performed within a predetermined SOC range (hereinafter referred to as "operating SOC range"). The operating SOC range may be 10% to 90%. For example, the first control unit 511 stops the discharge of the battery 130 when the SOC of the battery 130 reaches the lower limit of the operating SOC range during the discharge of the battery 130. When the second control unit 512 cannot create the charge and discharge schedule within the operating SOC range in S11, the vehicle 50 cannot respond to the VPP request. Therefore, the determination is "NO" in S13.

Figure 7:
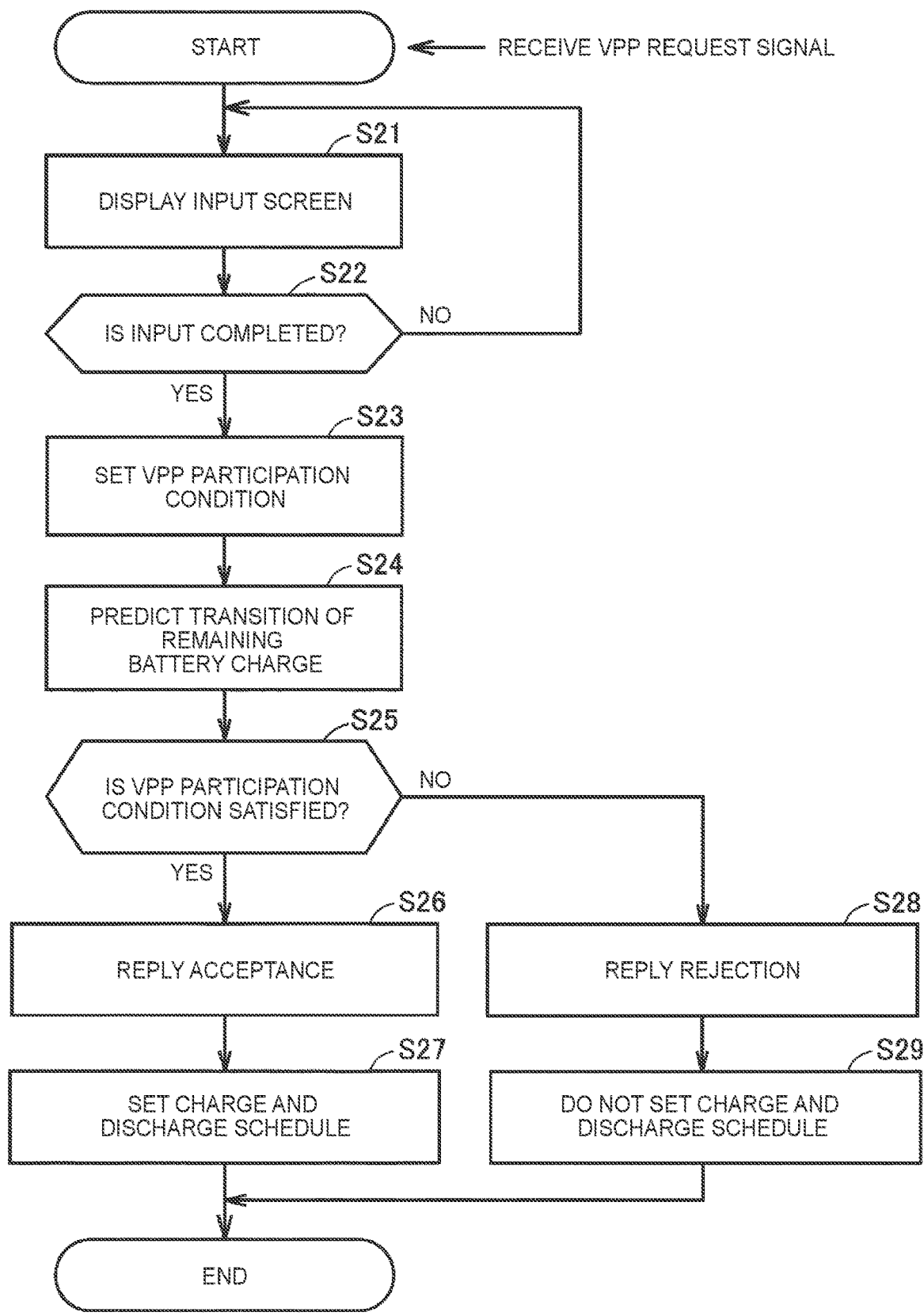
FIG. 7 is a flowchart illustrating an example of a process to be executed by the ECU when the second control unit illustrated in FIG. 3 operates in an automatic selection mode.

The user selection mode has been described above. Next, the automatic selection mode will be described. When the user selects the automatic selection mode via the mode input device, the second control unit 512 operates in the automatic selection mode. FIG. 7 is a flowchart illustrating an example of a process to be executed by the ECU 150 when the second control unit 512 operates in the automatic selection mode. The process in this flowchart is started, for example, when the vehicle 50 receives the VPP request signal while the second control unit 512 is operating in the automatic selection mode. Description is given of an example in which the energy management requested by the VPP request signal is discharge.

Referring to FIG. 7 together with FIGS. 1 to 3, the third control unit 513 causes a predetermined display device to display an input screen in S21. In the present embodiment, the predetermined display device is the same as the screen display device described above. Although details will be described later, the input screen is a screen for receiving an input from the user.

In S22, determination is made as to whether the input from the user is completed. The screen display device displays the input screen and receives the input from the user until the input from the user is completed. When the input from the user is completed (YES in S22), the third control unit 513 sets a VPP participation condition in S23 based on a value input by the user. In S24, the second control unit 512 determines a charge and discharge schedule in a target period and predicts a transition of the remaining battery charge (SOC of the battery 130) in the target period. The target period is, for example, the same as the target period in the process of FIG. 4. The method for determining the charge and discharge schedule in S24 is the same as that in S11 of FIG. 4. In S25, the second control unit 512 determines whether the VPP participation condition is satisfied based on the predicted transition of the remaining battery charge estimated in S24.

When the VPP participation condition is satisfied (YES in S25), the second control unit 512 notifies the server 30 about the request acceptance in S26. After the second control unit 512 sets the charge and discharge schedule in the target period that is determined in S24 on the first control unit 511 in S27, the series of processes illustrated in FIG. 7 is terminated. As a result, the server 30 is permitted to perform remote control on the first control unit 511.

When the VPP participation condition is not satisfied (NO in S25), the second control unit 512 notifies the server 30 about the request rejection in S28. Then, the series of processes illustrated in FIG. 7 is terminated without setting the charge and discharge schedule on the first control unit 511 (S29). In this case, the remote control on the first control unit 511 is forbidden.

As described above, when the communication apparatus 180 receives the VPP request signal from the server 30 while the second control unit 512 is operating in the automatic selection mode, the second control unit 512 determines whether the VPP request is accepted (S25) based on the predetermined condition (VPP participation condition), and notifies the server 30 about the determination result (S26 and S28).

Figure 8:
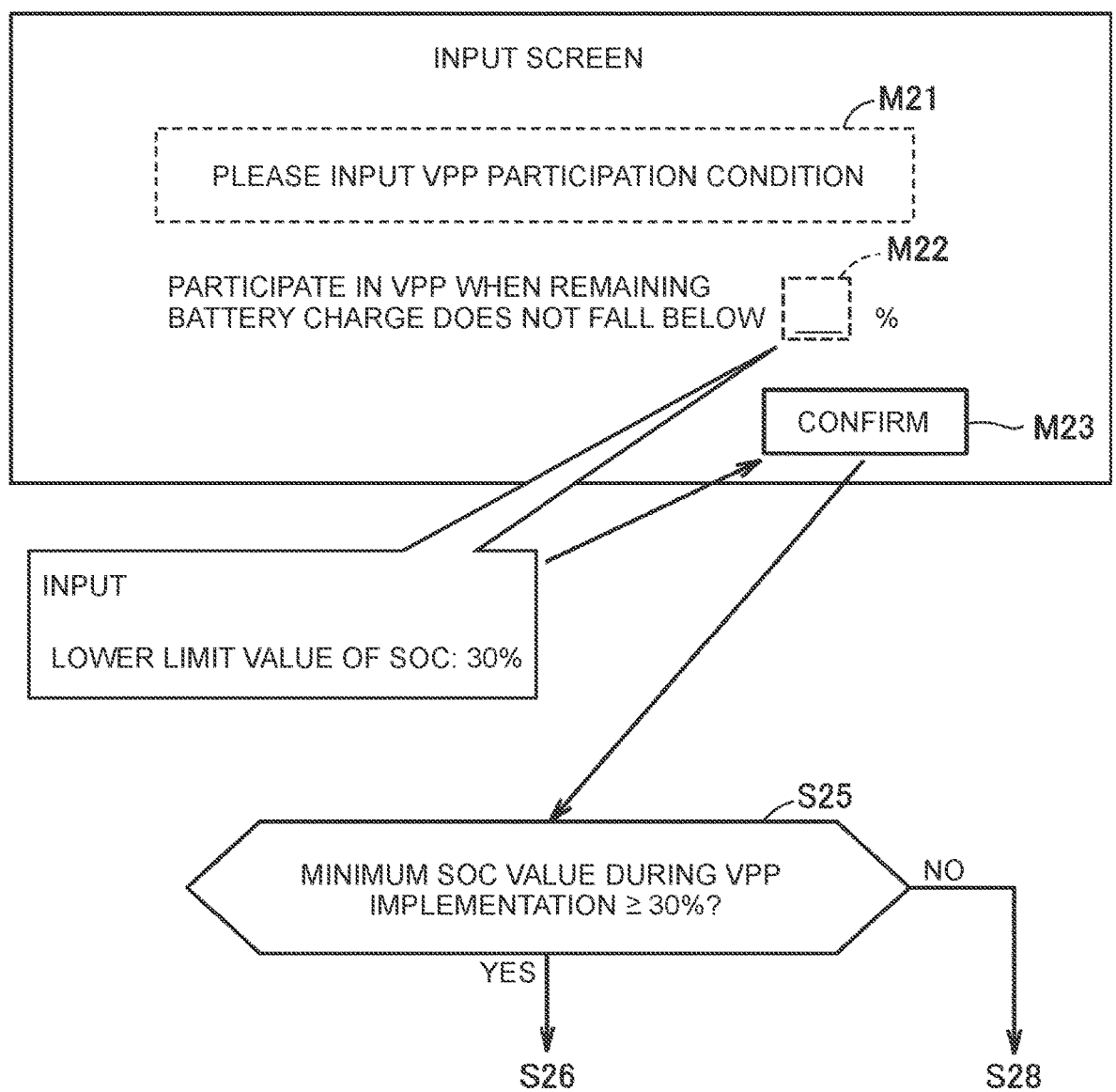
FIG. 8 is a diagram illustrating an example of an input screen to be displayed in the process illustrated in FIG. 7.

FIG. 8 is a diagram illustrating an example of the input screen to be displayed in S21 of FIG. 7. Referring to FIG. 8 together with FIG. 7, the input screen shows a message M21, an input field M22, and a "confirm" button M23. The message M21 prompts the user to input the VPP participation condition. The input field M22 is a space for inputting a lower limit value of the SOC of the battery 130 during VPP implementation. In the present embodiment, the numerical value that can be input to the input field M22 is limited to a value higher than the lower limit value of the operating SOC range. When the user presses the "confirm" button M23 after inputting a numerical value to the input field M22, the determination is "YES" in S22 of FIG. 7. For example, when "30%" is input to the input field M22 and the "confirm" button M23 is pressed, the VPP participation condition is set, in S23, to a condition that the SOC of the battery 130 during the VPP implementation does not fall below 30%. In S25, determination is made as to whether the SOC of the battery 130 during the VPP implementation (VPP request period) does not fall below 30%. When it is predicted that the minimum value of the SOC of the battery 130 during the VPP implementation is 30% or higher, determination is made that the VPP participation condition is satisfied (YES in S25), and the process proceeds to S26. When it is predicted that the SOC of the battery 130 during the VPP implementation falls below 30%, determination is made that the VPP participation condition is not satisfied (NO in S25), and the process proceeds to S28.

As described above, the lower limit value of the SOC of the battery 130 is specified as the VPP participation condition. The second control unit 512 that operates in the automatic selection mode determines that the VPP request is rejected when the second control unit 512 predicts that the SOC of the battery 130 falls below the lower limit value in a case where the first control unit 511 executes the charge and discharge control on the battery 130 in response to the VPP request. According to such a configuration, it is possible to suppress an excessive decrease in the remaining charge of the battery 130 by the energy management. The user can secure the electric power corresponding to the lower limit value in the battery 130. The electric power corresponding to the lower limit value may be electric power that secures, in the vehicle 50, a sufficient traveling capacity that the user can feel at ease, or may be electric power to be used by the user in the event of power failure.

The automatic selection mode has been described above. The ECU 150 according to the present embodiment can prompt the user to switch the user selection mode in which the user determines whether to respond to the energy management request and the automatic selection mode in which determination is automatically made as to whether to respond to the energy management request. For example, the user may adopt the user selection mode at an initial stage to view the prediction screen and carefully determine whether to respond to the energy management request, and may switch the user selection mode to the automatic selection mode when a certain tendency is grasped to automatically determine whether to respond to the energy management request.

The second control unit 512 may update the VPP participation condition by learning using history data when operating in the user selection mode. By updating the determination criterion (VPP participation condition) for use in the automatic determination by the learning using the history data of the user's determination, the automatic determination can easily be performed in a manner similar to that of the user's determination. The history data may include the predicted transition of the first parameter, the predicted transition of the second parameter, and information indicating whether the request has been accepted. The second control unit 512 may set the VPP participation condition by statistical analysis so that the automatic determination based on the VPP participation condition has the same result as that of the user's determination. The second control unit 512 can grasp a tendency of the user's determination by the learning using the history data. Artificial intelligence (AI) may be used to improve learning accuracy.

Figure 9:
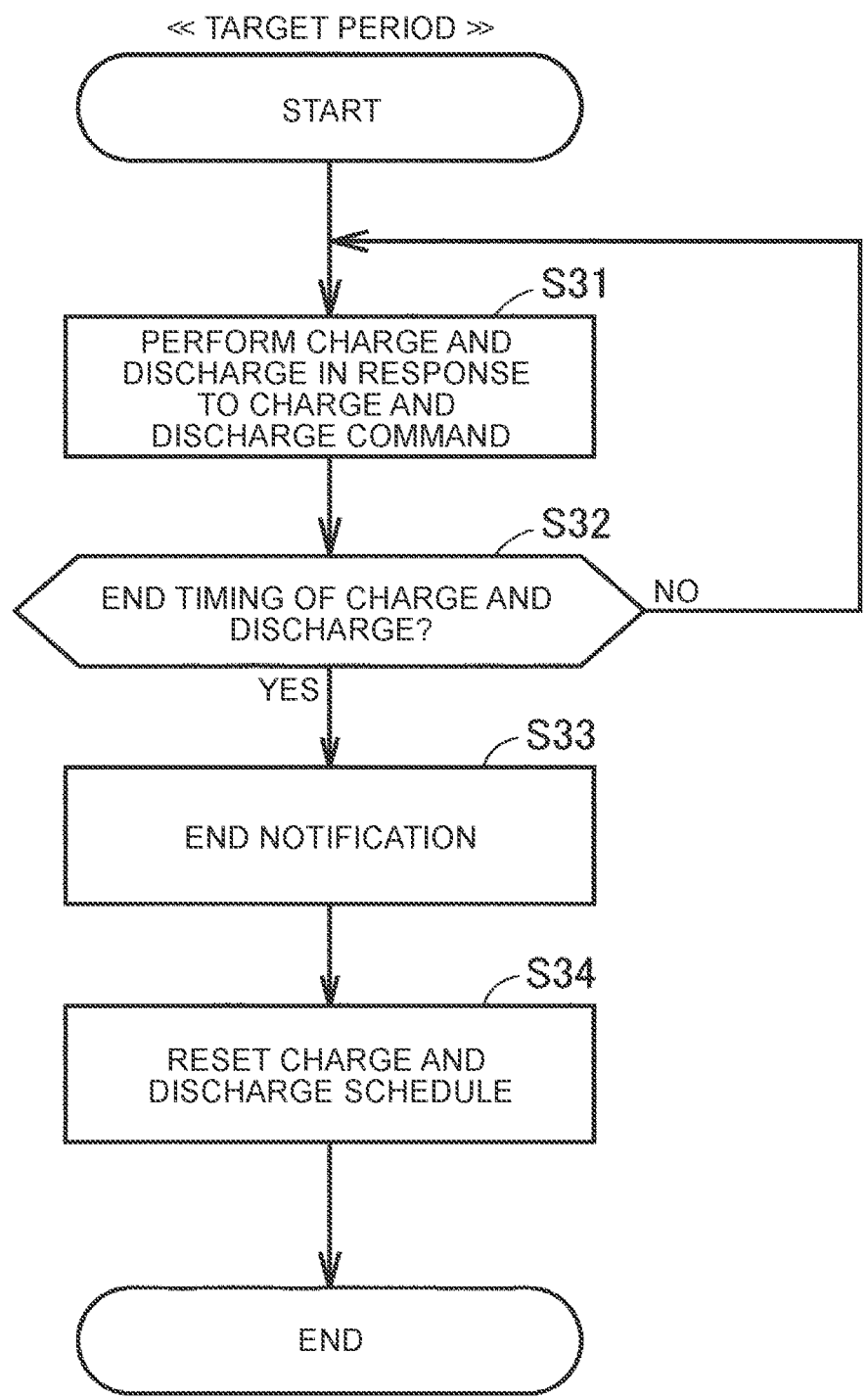
FIG. 9 is a flowchart illustrating charge and discharge control on a power storage device to be executed in accordance with a charge and discharge schedule in response to a virtual power plant (VPP) request.

FIG. 9 is a flowchart illustrating the charge and discharge control on the battery 130 to be executed in accordance with the charge and discharge schedule in response to the VPP request. The process in this flowchart is started when the start time of the charge and discharge schedule set on the first control unit 511 (start time of the target period) comes while the vehicle 50 is plugged in. In the target period (including the VPP request period), a charge and discharge command is transmitted from the server 30 to the vehicle 50. When the charge and discharge schedule is not set on the first control unit 511, the process illustrated in FIG. 9 is not executed.

Referring to FIG. 9 together with FIGS. 1 to 3, the first control unit 511 performs, in S31, the charge and discharge control on the battery 130 in response to the charge and discharge command received from the server 30. In S32, the first control unit 511 determines whether the end time of the set charge and discharge schedule has come. The processes of S31 and S32 are repeated until the end time of the charge and discharge schedule comes. When the end time of the charge and discharge schedule has come (YES in S32), the first control unit 511 notifies the server 30 about the end in S33. When the first control unit 511 resets the charge and discharge schedule in S34, the series of processes illustrated in FIG. 9 is terminated. By resetting the charge and discharge schedule in S34, no charge and discharge schedule is set on the first control unit 511. Thus, the remote control on the first control unit 511 is forbidden.

As described above, the vehicle 50 executes the charge and discharge in accordance with the charge and discharge schedule set on the first control unit 511 (that is, the accepted charge and discharge) in the plugged-in state in response to the command from the server 30. The server 30 remotely controls the plugged-in vehicle 50 so that the battery 130 is charged and discharged in accordance with the charge and discharge schedule set on the first control unit 511 through the process illustrated in FIG. 9. The charge and discharge control on the battery 130 is executed in a state in which the power grid PG and the battery 130 are electrically connected to each other. In the example in which the energy management requested by the VPP request signal is discharge, external power feeding is executed during the VPP request period by the remote control.

As described above, the control system according to the present embodiment is mounted on the vehicle 50, and includes the battery 130, the screen display device (for example, at least one of the input device 161, the NAVI 170, and the mobile terminal 80), and the ECU 150. The ECU 150 includes the first control unit 511 that performs the charge and discharge control on the battery 130, and the second control unit 512 that controls the display of the screen display device. The second control unit 512 causes the screen display device to display the prediction screen (that is, the screen showing, on the same time axis, the predicted transition of the first parameter relating to the remaining charge of the battery 130 and the predicted transition of the second parameter relating to the amount of reward for energy management under the assumption that the first control unit 511 executes the charge and discharge control on the battery 130 in response to the energy management request). From the prediction screen, the user can easily grasp how much electric power remains in the battery 130 during a time frame in which the user desires to use the battery 130. From the prediction screen, the user can check the amount of reward when responding to the energy management request. This makes it easier for the user to compare an advantage and disadvantage to respond to the energy management request. The user can easily and appropriately determine whether to respond to the request.

In the embodiment described above, the charge and discharge command is transmitted from the server 30 to the vehicle 50 in the target period (including the VPP request period). During the target period, the charge and discharge control on the battery 130 is performed by remote control. The present disclosure is not limited to such a configuration. Only the charge and discharge control within the VPP request period may be performed by remote control, and the charge and discharge control outside the VPP request period may be performed by local control of the ECU 150 instead of the remote control (command from the external computer).

It is not essential that the vehicle 50 be remotely controlled during the VPP request period. For example, when the start time of the charge and discharge schedule set on the first control unit 511 in S15 of FIG. 4 or S27 of FIG. 7 comes, the first control unit 511 may perform the charge and discharge control on the battery 130 in accordance with the charge and discharge schedule.

The prediction screen is not limited to the screen illustrated in FIG. 5, and may be changed as appropriate. For example, the prediction screen illustrated in FIG. 5 shows the predicted transition as the line graph, but the predicted transition may be shown in any format. For example, the prediction screen may show the predicted transition as a scatter diagram. In the prediction screen illustrated in FIG. 5, the first parameter is the SOC of the battery 130, and the second parameter is the incentive unit price (reward unit price). The first and second parameters on the prediction screen may be changed as appropriate. The prediction screen illustrated in FIG. 5 may be changed as follows.

Figure 10:
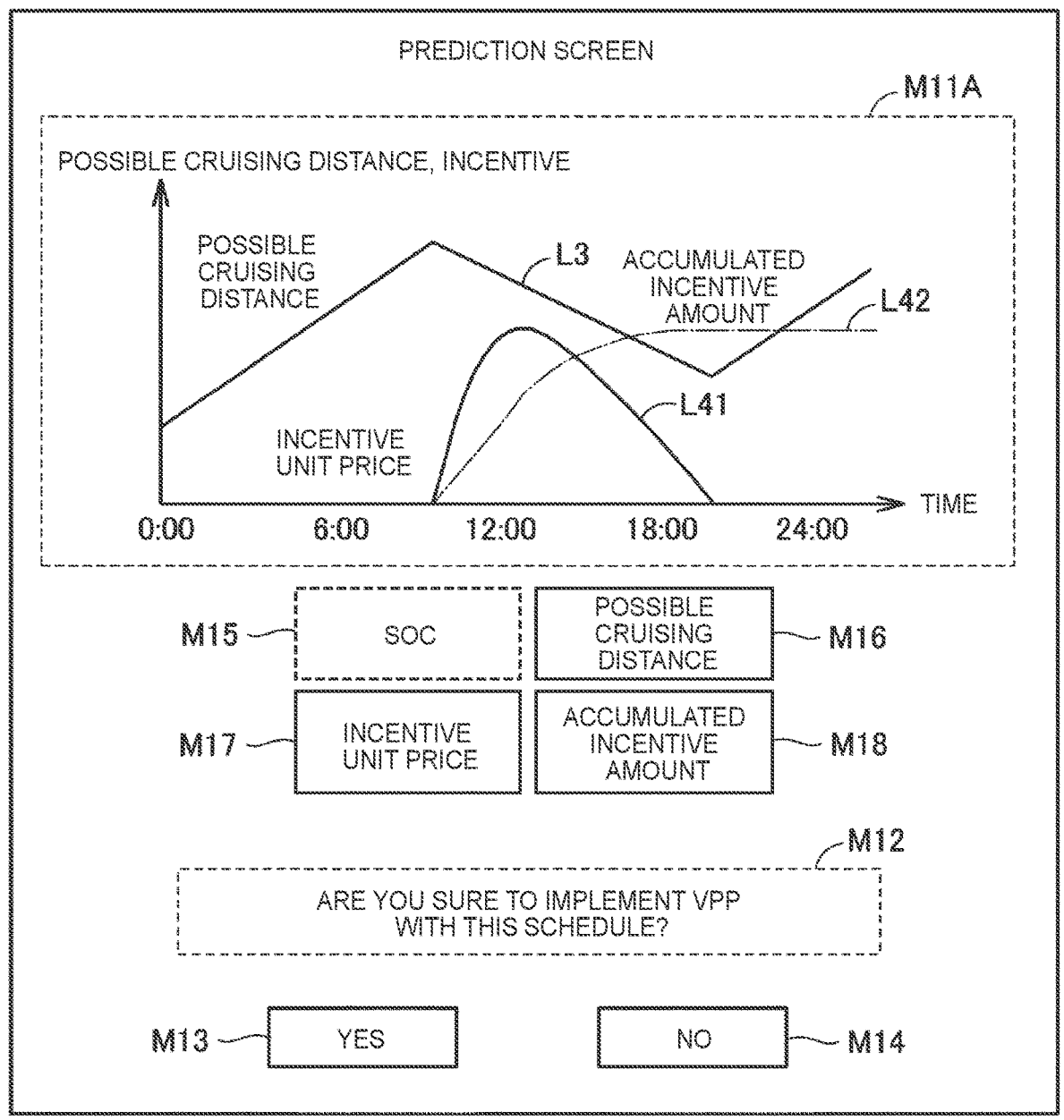
FIG. 10 is a diagram illustrating a first modification of the prediction screen illustrated in FIG. 5.

FIG. 10 is a diagram illustrating a first modification of the prediction screen illustrated in FIG. 5. Referring to FIG. 10, this prediction screen shows a graph M11A in place of the graph M11 illustrated in FIG. 5, and also shows an "SOC" button M15, a "possible cruising distance" button M16, an "incentive unit price" button M17, and an "accumulated incentive amount" button M18. The user can make switching as to whether to show or hide the items corresponding to the buttons (the SOC of the battery 130, the possible cruising distance of the vehicle 50, the incentive unit price, and the accumulated incentive amount) by operating the buttons. The SOC of the battery 130 and the possible cruising distance of the vehicle 50 each correspond to an example of the first parameter. As the SOC of the battery 130 increases, the possible cruising distance of the vehicle 50 increases. The incentive unit price and the accumulated incentive amount each correspond to an example of the second parameter.

The prediction screen according to the first modification shows, on the same time axis, the items for which "show" is selected with the buttons. For example, the graph M11A illustrated in FIG. 10 shows, on the same time axis, a predicted transition (line L3) of the possible cruising distance of the vehicle 50 in the target period, a predicted transition (line L41) of the incentive unit price in the target period, and a predicted transition (line L42) of the accumulated incentive amount on the VPP request in the target period under the assumption that the first control unit 511 executes the charge and discharge control on the battery 130 in response to the VPP request. In the example illustrated in FIG. 10, the item "SOC" (SOC of the battery 130) is hidden among the four items. The user can switch the item "SOC" from "hide" to "show" by operating the "SOC" button M15.

As described above, in the modification illustrated in FIG. 10, the third control unit 513 selects one or more first parameters from first options including the SOC of the battery 130 and the possible cruising distance of the vehicle 50 and one or more second parameters from second options including the incentive unit price (reward unit price) and the accumulated incentive amount (accumulated reward amount) based on the user's input to the predetermined input device (for example, the touch panel of the screen display device). The second control unit 512 causes the screen display device to display the prediction screen (FIG. 10) showing, on the same time axis, predicted transitions of the one or more first parameters selected from the first options and predicted transitions of the one or more second parameters selected from the second options. According to such a configuration, the user can arbitrarily select the first and second parameters to be shown on the prediction screen from the predetermined candidates. The user can check a plurality of first parameters (or a plurality of second parameters) simultaneously.

Figure 11:
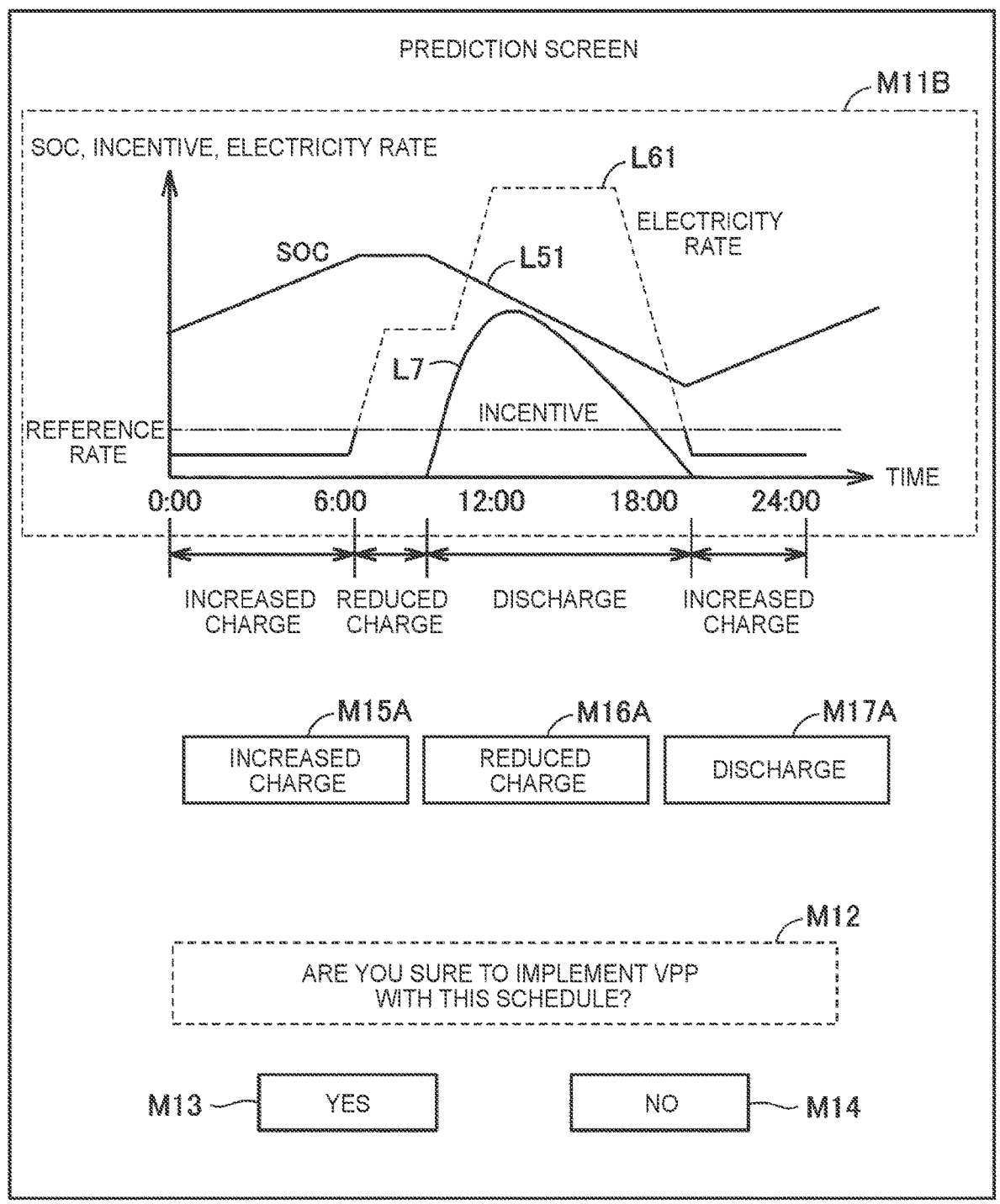
FIG. 11 is a diagram illustrating a second modification of the prediction screen illustrated in FIG. 5.

FIG. 11 is a diagram illustrating a second modification of the prediction screen illustrated in FIG. 5. Referring to FIG. 11, in this modification, the target period includes a first time frame in which increased charge is requested, a second time frame in which reduced charge is requested, and a third time frame in which discharge is requested. Among the time frames in which discharge is not requested, increased charge is requested in the time frame in which the electricity rate is equal to or lower than a predetermined reference rate, and reduced charge is requested in the time frame in which the electricity rate is higher than the predetermined reference rate. In this modification, in S11 of FIG. 4, the charge and discharge schedule (transition of charge and discharge power) in the target period is determined to perform the charge in response to the VPP request in the first time frame, forbid the charge in response to the VPP request in the second time frame, and perform the discharge in response to the VPP request in the third time frame. When the first control unit 511 executes the charge and discharge control on the battery 130 in accordance with this charge and discharge schedule, the vehicle 50 can respond to all of the requested increased charge, the requested reduced charge, and the requested discharge. The user may change the charge and discharge schedule after the prediction screen is displayed.

The prediction screen illustrated in FIG. 11 shows a graph M11B in place of the graph M11 illustrated in FIG. 5, and also shows an "increased charge" button M15A, a "reduced charge" button M16A, and a "discharge" button M17A. The user can switch acceptance and rejection of the energy management request (increased charge, reduced charge, or discharge) linked to each button by operating the button.

The prediction screen according to the second modification shows the predicted transitions of the first and second parameters on the same time axis under the assumption that a response is made to the energy management request accepted with the buttons. For example, the graph M11B illustrated in FIG. 11 shows, on the same time axis, a predicted transition (line L51) of the remaining battery charge (SOC of the battery 130) in the target period, a predicted transition (line L61) of an electricity rate unit price in the target period, and a predicted transition (line L7) of the incentive unit price on the VPP request in the target period under the assumption that the battery 130 is charged and discharged in accordance with the charge and discharge schedule (that is, the response is made to all of the requested increased charge, the requested reduced charge, and the requested discharge). Regarding the predicted transition (line L61) of the electricity rate unit price, a portion in which charge is not executed is indicated by a dashed line. The electricity rate unit price is an example of the second parameter. Instead of the electricity rate unit price, an accumulated amount of the electricity rate may be adopted.

Figure 12:
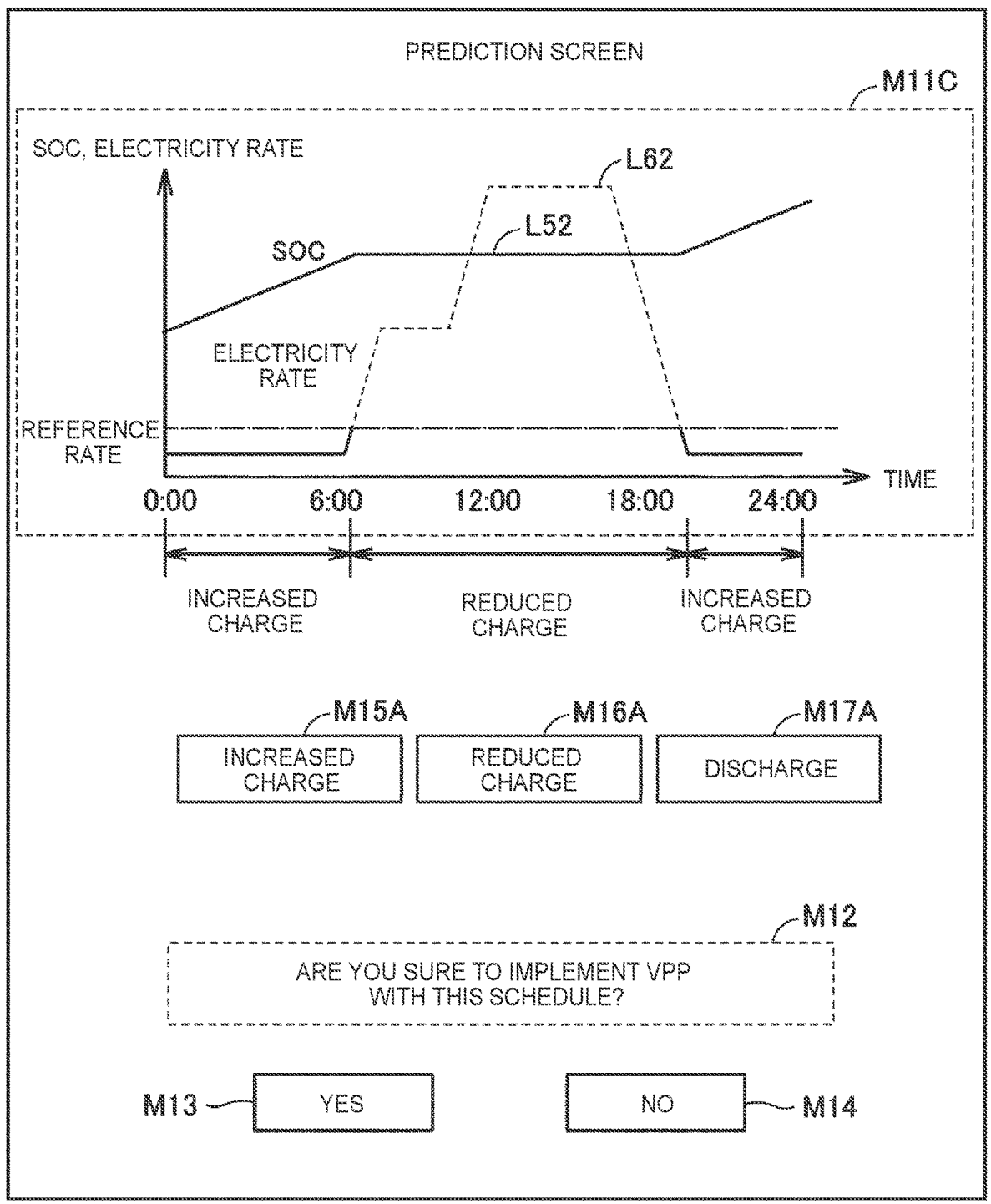
FIG. 12 is a diagram illustrating a prediction screen when discharge requested by a VPP request signal is rejected in the second modification.

FIG. 12 is a diagram illustrating a prediction screen when the discharge requested by the VPP request signal is rejected in the second modification. Referring to FIG. 12, when the "discharge" button M17A is operated on the prediction screen illustrated in FIG. 11 and the item "discharge" is changed from "accepted" to "rejected", the charge and discharge schedule in the target period is changed so as not to perform the discharge in the third time frame. When the first control unit 511 executes the charge and discharge control on the battery 130 in accordance with the changed charge and discharge schedule, the vehicle 50 can respond to the requested increased charge and the requested reduced charge. The graph M11B illustrated in FIG. 11 is changed to a graph M11C illustrated in FIG. 12. The graph M11C shows, on the same time axis, a predicted transition (line L52) of the remaining battery charge (SOC of the battery 130) in the target period and a predicted transition (line L62) of the electricity rate unit price in the target period under the assumption that the battery 130 is charged and discharged in accordance with the changed charge and discharge schedule (that is, the response is made to the requested increased charge and the requested reduced charge).

The prediction screen according to the second modification is displayed, for example, in S12 of FIG. 4. When a part of the request (for example, one of increased charge, reduced charge, and discharge) is rejected by the user and the "YES"

button M13 is selected, the server 30 is notified about both the accepted request and the rejected request in S14. For example, when the "YES" button M13 is selected in the state illustrated in FIG. 12, the requests for increased charge and reduced charge are accepted and the request for discharge is rejected. In S15, a charge and discharge schedule accepted by the user (that is, a charge and discharge schedule in response to the requests accepted by the user) is set on the first control unit 511.

Figure 13:
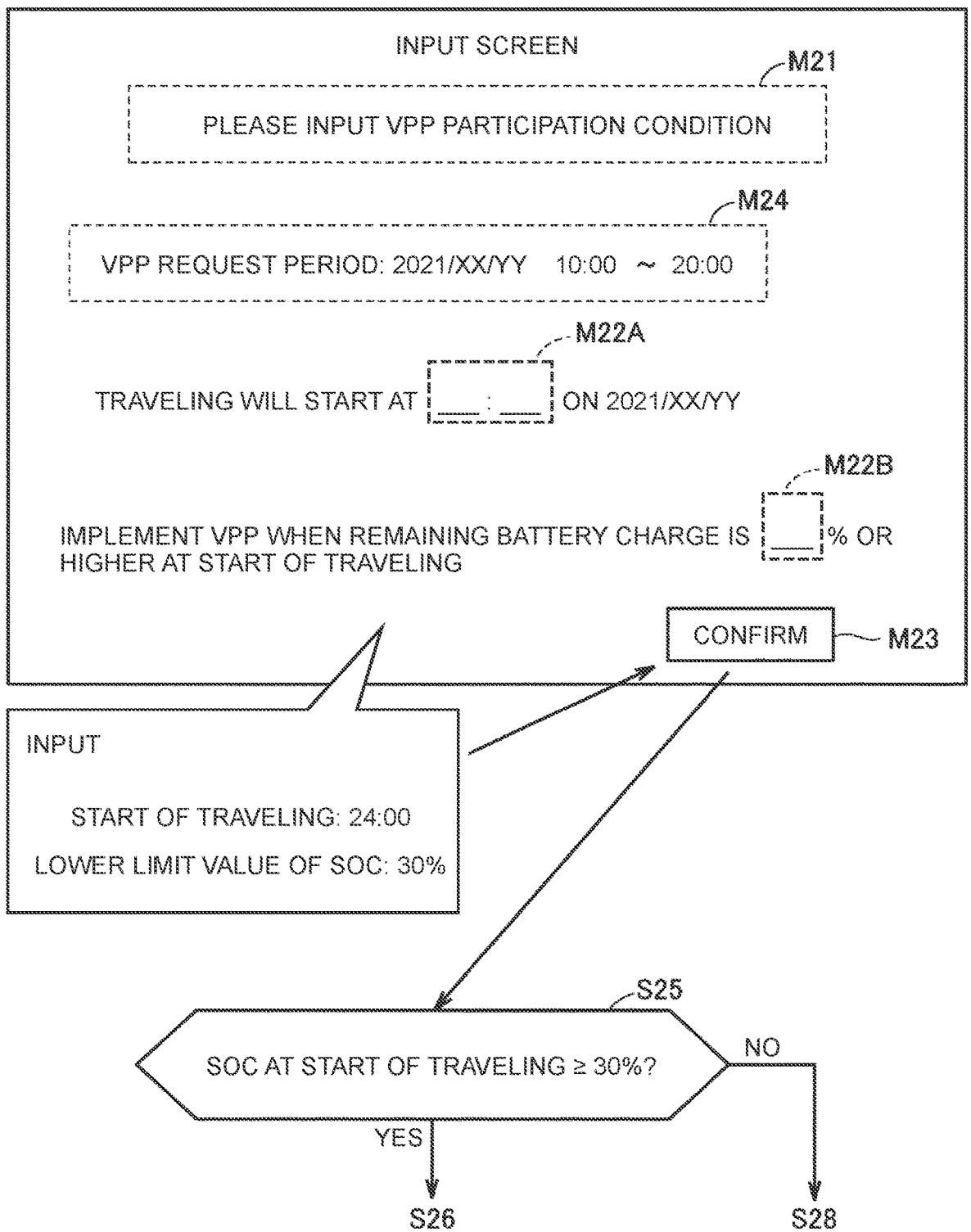
FIG. 13 is a diagram illustrating a first modification of the input screen illustrated in FIG. 8.

The input screen is not limited to the screen illustrated in FIG. 8, and may be changed as appropriate. FIG. 13 is a diagram illustrating a first modification of the input screen illustrated in FIG. 8. Referring to FIG. 13 together with FIG. 7, the input screen according to the first modification is displayed, for example, when the energy management requested by the VPP request signal is discharge. The input screen illustrated in FIG. 13 shows input fields M22A and M22B in place of the input field M22 illustrated in FIG. 8, and also shows a field M24 indicating the VPP request period. The input field M22A is a space for inputting a traveling start time. The input field M22B is a space for inputting a lower limit value of the SOC of the battery 130 at the traveling start time. For example, when "24:00" is input to the input field M22A, "30%" is input to the input field M22B, and the "confirm" button M23 is pressed, the VPP participation condition is set, in S23, to a condition that the SOC of the battery 130 at 24:00 does not fall below 30%. In S25, determination is made as to whether the SOC of the battery 130 at 24:00 does not fall below 30%. When the SOC of the battery 130 at 24:00 is 30% or higher, determination is made that the VPP participation condition is satisfied (YES in S25), and the process proceeds to S26. When the SOC of the battery 130 at 24:00 falls below 30%, determination is made that the VPP participation condition is not satisfied (NO in S25), and the process proceeds to S28.

Figure 14:
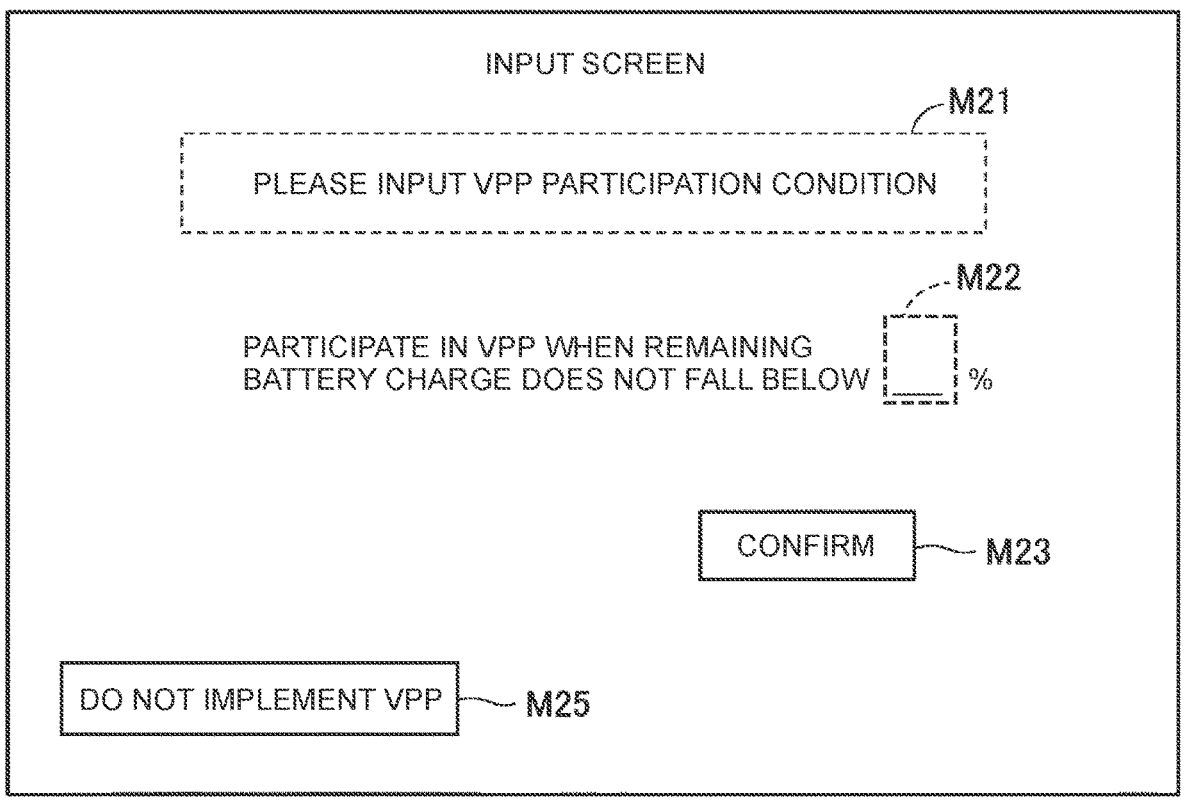
FIG. 14 is a diagram illustrating a second modification of the input screen illustrated in FIG. 8.

FIG. 14 is a diagram illustrating a second modification of the input screen illustrated in FIG. 8. Referring to FIG. 14 together with FIG. 7, this input screen also shows a "do not implement VPP" button M25 in addition to the message M21, the input field M22, and the "confirm" button M23 illustrated in FIG. 8. When the "do not implement VPP" button M25 is pressed by the user, the determination is "NO" in S25 of FIG. 7.

Figure 15:
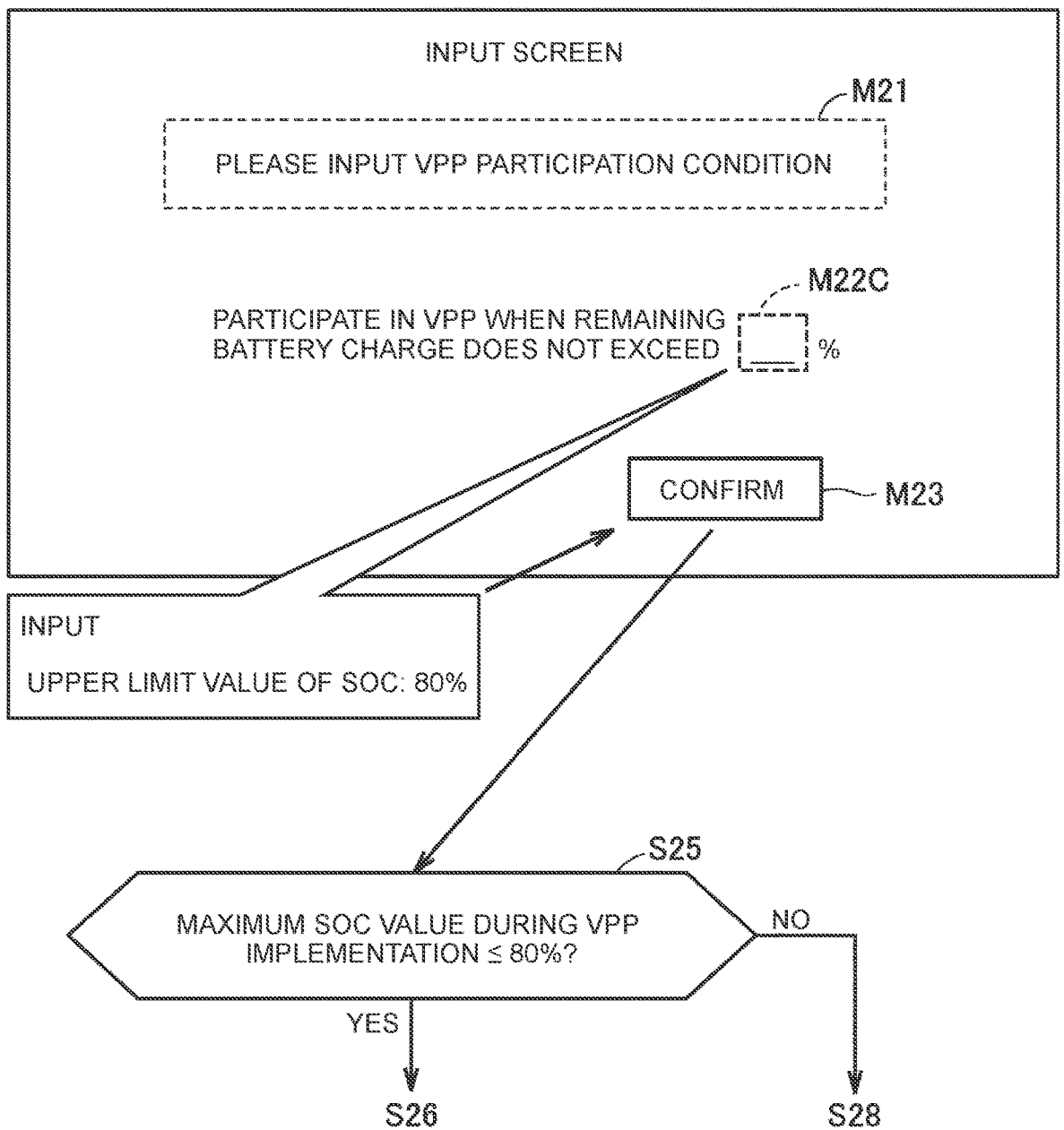
FIG. 15 is a diagram illustrating a third modification of the input screen illustrated in FIG. 8.

FIG. 15 is a diagram illustrating a third modification of the input screen illustrated in FIG. 8. Referring to FIG. 15 together with FIG. 7, the input screen according to the third modification is displayed, for example, when the energy management requested by the VPP request signal is increased charge. The input screen illustrated in FIG. 15 shows an input field M22C in place of the input field M22 illustrated in FIG. 8. The input field M22C is a space for inputting an upper limit value of the SOC of the battery 130 during VPP implementation. In this modification, the numerical value that can be input to the input field M22C is limited to a value lower than the upper limit value of the operating SOC range. For example, when "80%" is input to the input field M22C and the "confirm" button M23 is pressed, the VPP participation condition is set, in S23 of FIG. 7, to a condition that the SOC of the battery 130 during the VPP implementation does not exceed 80%. In S25, determination is made as to whether the SOC of the battery 130 during the VPP implementation does not exceed 80%. When it is predicted that the maximum value of the SOC of the battery 130 during the VPP implementation is 80% or lower, determination is made that the VPP participation condition is satisfied (YES in S25), and the process proceeds to S26. When it is predicted that the SOC of the battery 130 during the VPP implementation exceeds 80%, determination is made that the VPP participation condition is not satisfied (NO in S25), and the process proceeds to S28.

The upper limit value of the SOC of the battery 130 is specified as the VPP participation condition according to the third modification. The second control unit 512 that operates in the automatic selection mode determines that the VPP request is rejected when the second control unit 512 predicts that the SOC of the battery 130 exceeds the upper limit value in a case where the first control unit 511 executes the charge and discharge control on the battery 130 in response to the VPP request. According to such a configuration, it is possible to suppress an excessive increase in the remaining charge of the battery 130 by the energy management. Deterioration of the battery 130 is suppressed because the remaining charge of the battery 130 does not increase excessively. Both the lower limit value and the upper limit value of the remaining charge of the battery 130 may be specified as the VPP participation condition.

Figure 16:
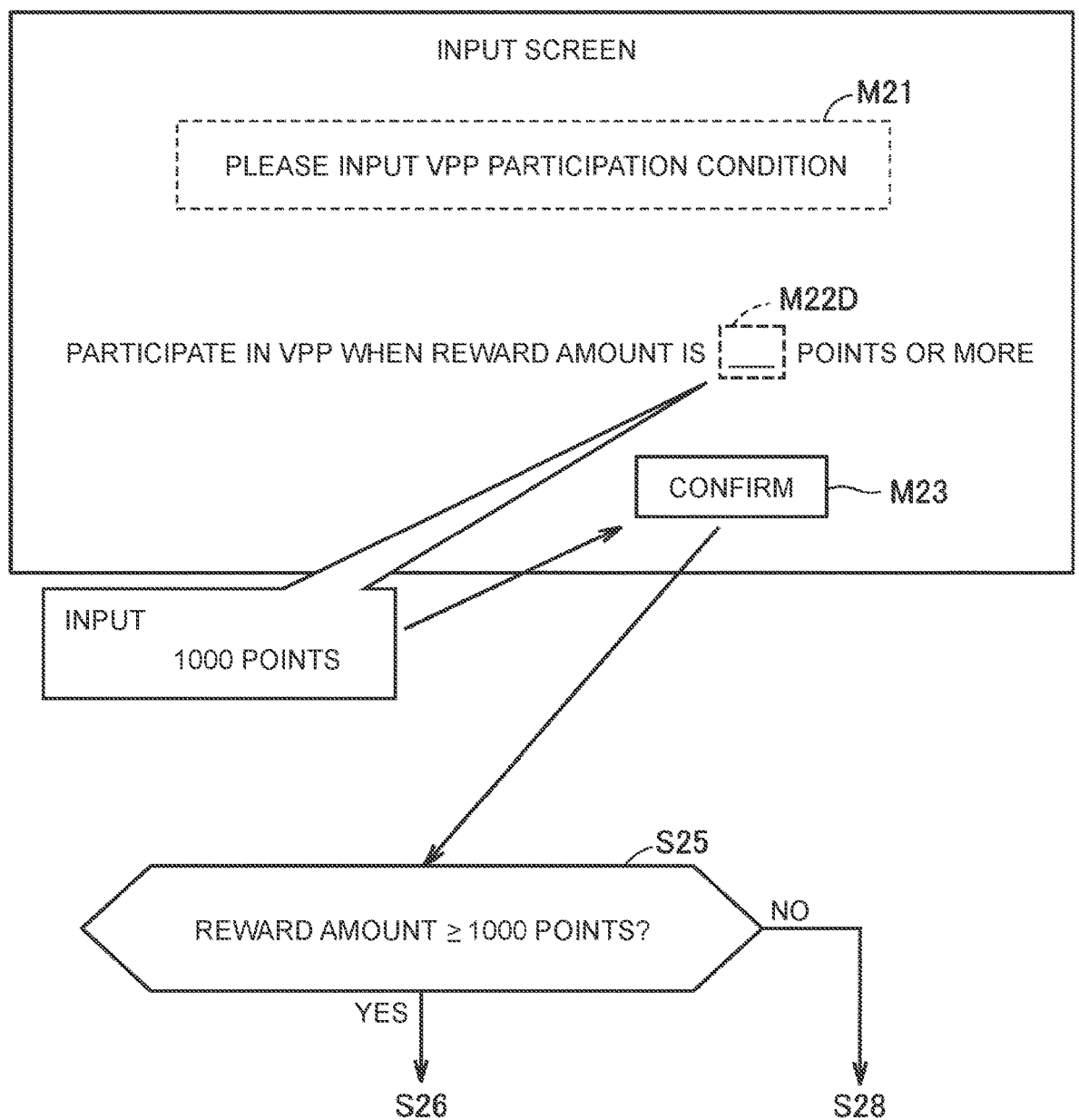
FIG. 16 is a diagram illustrating a fourth modification of the input screen illustrated in FIG. 8.

FIG. 16 is a diagram illustrating a fourth modification of the input screen illustrated in FIG. 8. Referring to FIG. 16 together with FIG. 7, this input screen shows an input field M22D in place of the input field M22 illustrated in FIG. 8. A desired amount of reward (requested reward amount) to be acquired by the user participating in this VPP (that is, responding to the energy management request) is input to the input field M22D. For example, when "1000 points" is input to the input field M22D and the "confirm" button M23 is pressed, the VPP participation condition is set, in S23 of FIG. 7, to a condition that the amount of reward to be given to the user who responds to this request is 1000 points or more. In S25, determination is made as to whether the reward amount indicated by the VPP request signal is 1000 points or more. When the reward amount indicated by the VPP request signal is 1000 points or more, determination is made that the VPP participation condition is satisfied (YES in S25), and the process proceeds to S26. When the reward amount indicated by the VPP request signal is less than 1000 points, determination is made that the VPP participation condition is not satisfied (NO in S25), and the process proceeds to S28.

The requested reward amount is specified as the VPP participation condition according to the fourth modification. The second control unit 512 that operates in the automatic selection mode determines that the request is accepted when the reward amount is equal to or more than the desired amount (requested reward amount) in a case where the first control unit 511 executes the charge and discharge control on the battery 130 in response to the VPP request. This configuration makes it easier to participate in high-paying energy management.

Although the modifications of the input screen have been described above, the display of the input screen is not essential. The VPP participation condition may be set without the input from the user. When the second control unit 512 operates in the automatic selection mode, the ECU 150 may execute a process illustrated in FIG. 17 below in place of the process illustrated in FIG. 7.

Figure 17:
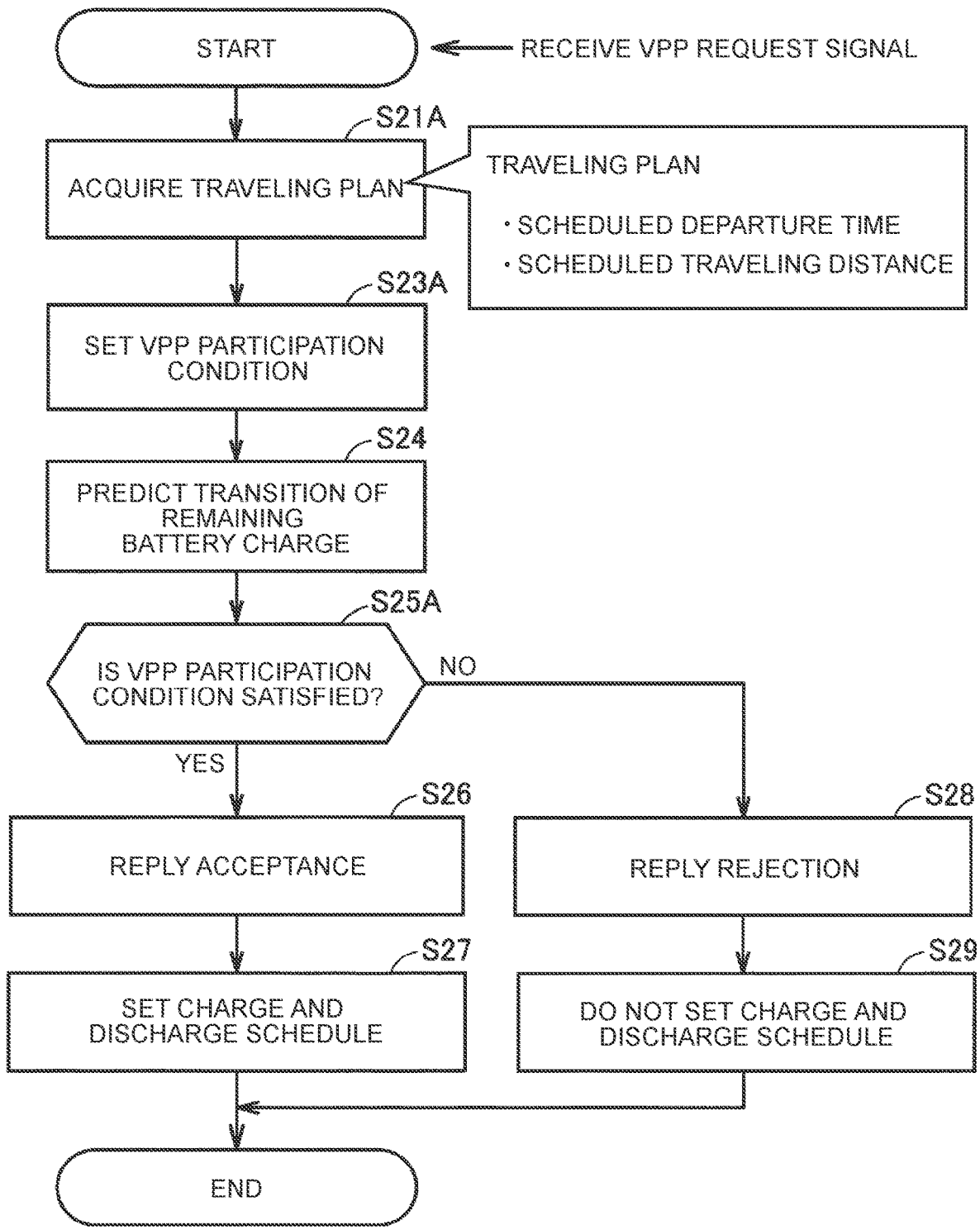
FIG. 17 is a diagram illustrating a modification of the process illustrated in FIG. 7.

FIG. 17 is a diagram illustrating a modification of the process illustrated in FIG. 7. The process illustrated in FIG. 17 is similar to the process illustrated in FIG. 7 except that S21A, S23A, and S25A are adopted in place of S21, S22, S23, and S25 (FIG. 7). The process illustrated in FIG. 17 will be described below with a focus on the differences from the process illustrated in FIG. 7.

In S21A, the second control unit 512 acquires a traveling plan. The traveling plan includes, for example, a scheduled departure time and a scheduled traveling distance. The traveling plan may be preset on the NAVI 170. For example, when the user inputs a scheduled departure time (traveling start time) and a destination to the NAVI 170, the NAVI 170 detects a current position of the vehicle 50 based on a GPS signal and determines a traveling route from the current position to the destination. The NAVI 170 calculates a traveling distance from the current position to the destination (that is, a scheduled traveling distance) based on the determined traveling route. The second control unit 512 may acquire the traveling plan from the NAVI 170 in S21A. When the traveling plan is not set on the NAVI 170, the second control unit 512 may request the user to set the traveling plan.

In S23A, the second control unit 512 sets a VPP participation condition. When the scheduled departure time is later than the end time of the VPP request period, the VPP participation condition is set to a condition that the possible cruising distance of the vehicle 50 at the scheduled departure time is equal to or longer than the scheduled traveling distance. Although illustration is omitted in FIG. 17, when the scheduled departure time is earlier than the end time of the VPP request period (including a case where the scheduled departure time is within the VPP request period), determination is made that the VPP participation condition is not satisfied, and the process proceeds to S28.

In S24, the second control unit 512 determines a charge and discharge schedule in a target period and predicts a transition of the remaining battery charge (SOC of the battery 130) in the target period. In S25A, determination is made as to whether the possible cruising distance of the vehicle 50 at the scheduled departure time is equal to or longer than the scheduled traveling distance. As the SOC of the battery 130 at the scheduled departure time increases, the possible cruising distance of the vehicle 50 at the scheduled departure time increases. When the possible cruising distance of the vehicle 50 at the scheduled departure time is equal to or longer than the scheduled traveling distance, determination is made that the VPP participation condition is satisfied (YES in S25A), and the process proceeds to S26. When the possible cruising distance of the vehicle 50 at the scheduled departure time is shorter than the scheduled traveling distance, determination is made that the VPP participation condition is not satisfied (NO in S25A), and the process proceeds to S28.

In the modification described above, the second control unit 512 that operates in the automatic selection mode determines that the request is rejected when the second control unit 512 predicts that the vehicle 50 cannot travel in accordance with the traveling plan in a case where the first control unit 511 executes the charge and discharge control on the battery 130 in response to the VPP request. According to such a configuration, it is possible to reduce the occurrence of the case where the vehicle 50 cannot travel in accordance with the traveling plan by the energy management. More specifically, it is possible to reduce the occurrence of a case where the vehicle 50 cannot travel in accordance with the traveling plan due to an excessive decrease in the remaining charge of the battery 130 by the energy management. Since the vehicle 50 does not participate in the VPP when the scheduled departure time is earlier than the end time of the VPP request period, it is possible to reduce the occurrence of a case where the vehicle 50 cannot depart at the scheduled departure time (departure time of the traveling plan) because the vehicle 50 is forced to stay for the energy management.

Figure 18:
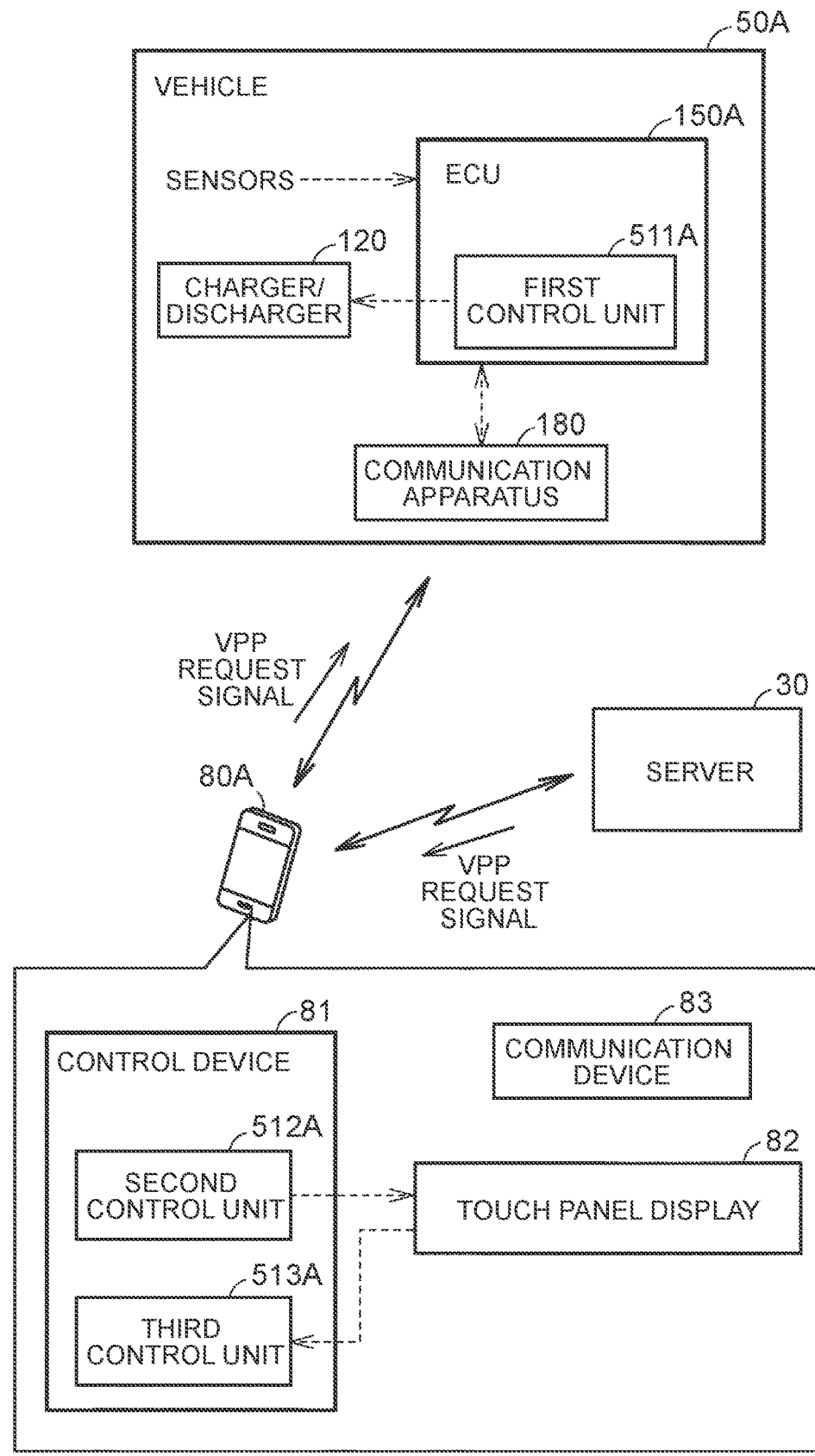
FIG. 18 is a diagram illustrating a modification of the configuration of the control system illustrated in FIG. 3.

The mobile terminal 80 may display the prediction screen. For example, the functions of the second control unit 512 and the third control unit 513 in the vehicle 50 may be implemented on the mobile terminal 80. FIG. 18 is a diagram illustrating a modification of the configuration of the control system illustrated in FIG. 3.

Referring to FIG. 18, a mobile terminal 80A according to this modification includes a second control unit 512A and a third control unit 513A. A vehicle 50A according to this modification includes an ECU 150A. The ECU 150A includes a first control unit 511A. The first control unit 511A, the second control unit 512A, and the third control unit 513A have functions similar to those of the first control unit 511, the second control unit 512, and the third control unit 513 of the ECU 150 illustrated in FIG. 3, respectively. In this modification, the first control unit 511A, the second control unit 512A, and the third control unit 513A are examples of "first control device", "second control device", and "third control device" according to the present disclosure, respectively.

The mobile terminal 80A includes a control device 81, a touch panel display 82, and a communication device 83. The control device 81 may be a computer. The control device 81 includes a processor and performs predetermined information processing. The control device 81 wirelessly communicates with the outside via the communication device 83. The control device 81 includes the second control unit 512A and the third control unit 513A. The second control unit 512A and the third control unit 513A are embodied by, for example, the processor and programs executed by the processor. These units are not necessarily embodied by the processor and the programs, and may be embodied by dedicated hardware (electronic circuit).

The mobile terminal 80A is carried by a user of the vehicle 50A and functions as a user interface. In the mobile terminal 80A, the touch panel display 82 functions as the mode input device and the screen display device. When the vehicle 50A is selected as a VPP cooperating vehicle, a VPP request signal is transmitted from the server 30 to the mobile terminal 80A.

When the mobile terminal 80A receives the VPP request signal while the second control unit 512A is operating in the user selection mode, the process illustrated in FIG. 4 is executed and the second control unit 512A causes the touch panel display 82 to display the prediction screen (see, for example, FIGS. 5 and 10 to 12) (S12). In this case, the user of the vehicle 50A can view the prediction screen and determine whether to accept the request. When the user of the vehicle 50A inputs request acceptance to the mobile terminal 80A (YES in S13), the mobile terminal 80A notifies the server 30 about the request acceptance (S14). Then, the mobile terminal 80A transmits the VPP request signal to the vehicle 50A (FIG. 18). When the user of the vehicle 50A inputs request rejection to the mobile terminal 80A (NO in S13), the mobile terminal 80A notifies the server 30 about the request rejection (S16).

When the mobile terminal 80A receives the VPP request signal while the second control unit 512A is operating in the automatic selection mode, the process illustrated in FIG. 7 is executed. When the request is accepted (YES in S25), the mobile terminal 80A notifies the server 30 about the request acceptance (S26). Then, the mobile terminal 80A transmits the VPP request signal to the vehicle 50A (FIG. 18). When the request is rejected (NO in S25), the mobile terminal 80A notifies the server 30 about the request rejection (S28).

The mobile terminal 80A according to this modification displays the prediction screen showing, on the same time axis, the predicted transition of the first parameter relating to the remaining charge of the battery 130 and the predicted transition of the second parameter relating to the amount of reward for energy management under the assumption that the charge and discharge control is executed on the battery 130 in response to the energy management request. With such a display device (mobile terminal 80A), it is possible to clearly show, to the user, the advantage and disadvantage to respond to the energy management request.

It is not essential that each of the second control unit 512 (FIG. 3) and the second control unit 512A (FIG. 18) be operable in the plurality of control modes. Each of the second control unit 512 and the second control unit 512A may always operate in the user selection mode.

The configuration of the electric power system including the management computer for the power network is not limited to the configuration illustrated in FIG. 2. For example, the server 10 may have the functions of the server 30, and the server 30 may be omitted. The server 10 may function as the management computer for the power network. The electric power company may be spun off by business. The power producer and the power transmission and distribution business operator may be different companies. The vehicle 50 may be a vehicle that belongs to the user who signed an incentive contract with the power producer or the power transmission and distribution business operator. The power network is not limited to a large-scale power network (power grid) developed as an infrastructure, and may be a microgrid. The computer that transmits the VPP request signal may be a server for an electricity market (for example, a balancing market).

The configuration of the vehicle is not limited to the configuration illustrated in FIG. 1. For example, the vehicle may be contactlessly chargeable. The vehicle is not limited to a passenger car, and may be a bus or a truck. The vehicle is not limited to a POV, and may be a Mobility as a Service (MaaS) vehicle. The vehicle may be capable of autonomous driving or may have a flying function. The vehicle may be a vehicle capable of unmanned driving (for example, an automated guided vehicle (AGV) or an agricultural machine).

The vehicle may be DC-chargeable. The vehicle may respond to the energy management request by using DC-EVSE. The power conversion circuit of the charger/discharger 120 may be mounted on the EVSE instead of the vehicle. An external computer (for example, the server 30) may perform energy management by remotely controlling the power conversion circuit mounted on the EVSE.

The vehicle is not limited to the BEV, and may be a plug-in hybrid electric vehicle (PHEV). In the PHEV, the total distance of a possible cruising distance by an electric motor (distance corresponding to the remaining charge) and a possible cruising distance by an internal combustion engine (distance corresponding to the remaining fuel amount) may be adopted as the first parameter. In place of or in addition to the total distance, the possible cruising distance by the electric motor may be adopted as the first parameter.

The vehicle may perform only external charging out of external charging and external power feeding, and may respond only to the energy management request for charge (for example, the request for increased charge or reduced charge). The vehicle may respond to the energy management request for charge by using EVSE that is not compatible with reverse power flow.

The power storage device used for energy management may be mounted on a power adjustment resource other than a vehicle. The power adjustment resource may be a moving body other than a vehicle (ship, airplane, drone, walking robot, robot cleaner, space probe, etc.) or may be a stationary energy storage system (ESS).

The external computer of the present disclosure may be a computer that manages the power grid. The energy management may be an adjustment of supply and demand of power in the power grid. The processor of the present disclosure may be configured to, when the power storage device is electrically connected to the power grid, perform charge and discharge control on the power storage device according to a charge and discharge command from the external computer.

The requested reward amount may be any value set by a user, or may be a prescribed value that is set automatically.

The control system of the present disclosure may be mounted on an electrified vehicle. The electrified vehicle is configured to travel by using electric power stored in the power storage device. Examples of the electrified vehicle include a battery electric vehicle (BEV), a hybrid electric vehicle (HEV), a plug-in hybrid electric vehicle (PHEV), a fuel cell electric vehicle (FCEV), and a range extender EV.

The amount of reward for energy management includes not only the amount of incentive acquired when the user performs energy management, but also the amount of penalty imposed when the user does not perform energy management. This is because the user's action of avoiding penalty by performing energy management is substantially the same as the user's action of receiving a reward equal to the amount of the penalty by performing energy management. In a system in which the user pays a higher electricity rate when the user does not perform energy management than when the user performs energy management, the high electricity rate is an example of the penalty.

The various modifications described above may be combined as desired. The embodiment disclosed herein should be considered as illustrative and not restrictive in all respects. The scope of the present disclosure is shown by the claims rather than by the above description of the embodiment and is intended to include all modifications within the meaning and scope equivalent to those of the claims.

What is claimed is:

1. A control system comprising:
   a power storage device;
   a display device;
   a communication device communicable with an external computer;
   an input device configured to receive an input from a user; and
   a processor, wherein
   the processor is configured to:
      perform charge and discharge control on the power storage device;
      perform display control on the display device;
      cause the display device to display a screen that shows, on a graph in which an axis indicates time, a predicted transition of a first parameter relating to a remaining charge of the power storage device and a predicted transition of a second parameter relating to an amount of reward for energy management, under an assumption that the charge and discharge control is executed on the power storage device in response to an energy management request;
      execute a predetermined process based on the input to the input device from the user;

cause the display device to display the screen when the communication device receives the energy management request from the external computer; and notify the external computer about whether to accept the energy management request when information indicating whether to accept the energy management request is input to the input device after the screen is displayed.

2. The control system according to claim 1, wherein the processor is configured to:

operate in a control mode out of a first control mode and a second control mode;

switch the control mode based on the input to the input device from the user;

cause the display device to display the screen when the communication device receives the energy management request from the external computer in a case where the processor operates in the first control mode; and when the communication device receives the energy management request from the external computer in a case where the processor operates in the second control mode, determine whether to accept the energy management request based on a predetermined condition and notify the external computer about a determined result.

3. The control system according to claim 2, wherein:

the predetermined condition includes a lower limit value of the remaining charge of the power storage device; and the processor is configured to reject the energy management request, when the processor operates in the second control mode and predicts that the remaining charge of the power storage device falls below the lower limit value in a case where the charge and discharge control is executed on the power storage device in response to the energy management request.

4. The control system according to claim 2, wherein:

the predetermined condition includes an upper limit value of the remaining charge of the power storage device; and the processor is configured to reject the energy management request, when the processor operates in the second control mode and predicts that the remaining charge of the power storage device exceeds the upper limit value in a case where the charge and discharge control is executed on the power storage device in response to the energy management request.

5. The control system according to claim 2, wherein:

the predetermined condition includes a requested reward amount; and the processor is configured to accept the energy management request, when the processor operates in the second control mode and predicts that a reward amount is equal to or more than the requested reward amount in a case where the charge and discharge control is executed on the power storage device in response to the energy management request.

6. The control system according to claim 2, wherein:

the power storage device is mounted on a vehicle; and the processor is configured to reject the energy management request, when the processor operates in the second control mode and predicts that the vehicle is not able to travel in accordance with a traveling plan in a case where the charge and discharge control is executed on the power storage device in response to the energy management request.

7. The control system according to claim 1, wherein the processor is configured to:

cause the display device to display a screen that shows, on the graph, predicted transitions of one or more first parameters selected from first options, and predicted transitions of one or more second parameters selected from second options, the first options including an SOC of the power storage device and a possible cruising distance of a vehicle including the power storage device, the second options including a reward unit price and an accumulated reward amount; and select the one or more first parameters from the first options and select the one or more second parameters from the second options based on the input to the input device from the user.

8. The control system according to claim 1, wherein:

the energy management request requests discharge of the power storage device; and the first parameter is an SOC of the power storage device, and the second parameter is a reward unit price.

9. The control system according to claim 1, wherein the processor is configured to:

permit remote control of the external computer when the energy management request is accepted; and forbid the remote control of the external computer when the energy management request is rejected.

10. A control system comprising:

a power storage device;

a display device;

a communication device communicable with an external computer;

an input device configured to receive an input from a user;

a first processor configured to perform charge and discharge control on the power storage device; and a second processor different from the first processor and configured to:

perform display control on the display device; and cause the display device to display a screen that shows, on a graph in which an axis indicates time, a predicted transition of a first parameter relating to a remaining charge of the power storage device and a predicted transition of a second parameter relating to an amount of reward for energy management under an assumption that the charge and discharge control is executed on the power storage device in response to an energy management request; wherein the second processor is configured to:

execute a predetermined process based on the input to the input device from the user;

cause the display device to display the screen when the communication device receives the energy management request from the external computer; and notify the external computer about whether to accept the energy management request when information indicating whether to accept the energy management request is input to the input device after the screen is displayed.

* * * * *